United States Patent
Yamada

(10) Patent No.: US 7,935,368 B2
(45) Date of Patent: May 3, 2011

(54) SAFE AND STABLE EDIBLE MATERIAL HAVING REINFORCED CONCRETE-LIKE STRUCTURE

(76) Inventor: Yasuyuki Yamada, Nagoya (JP)

( * ) Notice: Subject to any disclaimer, the term of this patent is extended or adjusted under 35 U.S.C. 154(b) by 0 days.

(21) Appl. No.: 12/023,771

(22) Filed: Jan. 31, 2008

(65) Prior Publication Data

US 2008/0213412 A1  Sep. 4, 2008

(51) Int. Cl.
*A01N 65/00* (2009.01)
(52) U.S. Cl. ........................................ 424/725
(58) Field of Classification Search ........................ None
See application file for complete search history.

(56) References Cited

U.S. PATENT DOCUMENTS

| | | | |
|---|---|---|---|
| 4,226,895 A | | 10/1980 | Miller et al. |
| 4,284,655 A | | 8/1981 | Miller et al. |
| 5,011,532 A | * | 4/1991 | Fuisz ........................ 106/217.7 |
| 5,051,133 A | | 9/1991 | Nagai et al. |
| 5,158,615 A | | 10/1992 | Nagai et al. |
| 5,409,727 A | | 4/1995 | Tholl |

FOREIGN PATENT DOCUMENTS

| | | | |
|---|---|---|---|
| JP | 60-37930 | | 2/1985 |
| JP | 3-43052 | | 2/1991 |
| JP | 7-322849 | | 12/1995 |
| JP | 2001-238597 | | 9/2001 |
| JP | 2002-53407 | | 10/2002 |
| JP | 2002-300865 | | 10/2002 |
| JP | 2004-298061 | | 10/2004 |
| JP | 2006-9007 | | 1/2006 |
| JP | 2006-143887 | | 6/2006 |
| KR | 2003012209 | * | 2/2003 |
| WO | WO00/40095 | | 7/2000 |
| WO | WO2004/069877 A1 | | 8/2004 |
| WO | WO 2005/079593 | * | 9/2005 |

OTHER PUBLICATIONS

Jug of Olive oil, 5 pages, 2004.*

* cited by examiner

*Primary Examiner* — Michael V Meller
(74) *Attorney, Agent, or Firm* — Cooper & Dunham LLP

(57) ABSTRACT

It is intended to provide a stable and safe edible material. By mixing a dehydrated edible fiber mass and an edible non-fiber material, an edible material, which is superior in shape retention properties to the dehydrated edible fiber mass and the edible non-fiber material, can be obtained. This edible material has a high stability and a high safety because of having a reinforced concrete-like structure wherein the edible fiber serves as the reinforcing steel while the edible non-fiber material serves as the concrete. A liquid oil such as EV olive oil, rapeseed oil, sesame oil or soybean oil can be easily and safely converted into a solid fat merely by adding from 2 to 3% of a popular food material that has been naturally and safely taken since early times. In producing the above edible material, no trans processing that has been warned as the dangerousness thereof by the governments and public corporations in Europe, USA and Canada is needed. Moreover, this edible material sustains a favorable hardness within a temperature range of from −20° C. to 200° C. without becoming too hard at low temperatures as margarine or melting at high temperatures. When put into the mouth, however, it quickly liquefies and tastes wonderful. Water may be added thereto, though it is not always necessary. It prevents butter or chocolate from melting even at +200° C. Furthermore, a convenient and tough edible plastic material can be obtained therefrom without needing water.

18 Claims, No Drawings

SAFE AND STABLE EDIBLE MATERIAL HAVING REINFORCED CONCRETE-LIKE STRUCTURE

TECHNICAL FIELD

This invention relates to the safe and stable edible material.

BACKGROUND

It is important from the aspects such as health, transportation, storage, shock-resistance etc. to make food safe and to hold the stable shape. For example, as follows. 1. In order to transform liquid oil into form of butter and paste which are easy to use, trans-fat synthesis and mixture of industrial waxes are done. The governments and the public organizations of Europe, U.S. and Canada warned that trans-fat is dangerous. 2. In order to prevent liquefaction and denaturalization by heat, refrigeration is necessary always even during transportation. 3. Chocolate, butter and margarine immediately dissolves in the tropics or in summer. 4. Refrigerated margarine and butter are very hard as ice. They must be warmed and softened before use. 5. Strong shock-resistant cushion containers are necessary to prevent damage. 6. In order to prevent ingredient separation, soy bean lecithin is necessary, which is allergenic, hard to use, unsavory, and sticky hard. An expensive homogenizer is necessary before use. Et cetera.

DETAILED DESCRIPTION

This invention was done in view of the above present conditions, and is aimed for an offer of the safe and stable edible material.

After repeated trials and errors in view of the above conventional technical problems, the inventor discovered that the safe and stable edible material can be made, as to make a structural body from a reinforcing rod and concrete in the case of a building, by mixing edible fiber and non-fiber edible material. Then this invention was made.

This invention was made by mixing the aggregate of dehydrated edible fiber and non-fiber edible material. This mixture has stronger shape-holding as compared to the aggregate of dehydrated edible fiber and non-fiber edible material. With respect to the structure, macroscopic, microscopic, or molecular structure is not discriminated. In other words, from macroscopic to molecular transformation is included.

As for such edible material, edible fiber works as the reinforcing rod, and non-fiber edible material works as the concrete. The mixture has stronger shape holdout than the shape holdout of the aggregate of the dehydrated edible fiber and the shape holdout of the non-fiber edible material. It becomes stable and safe. The edible fiber did not mind its size, id est, macroscopic, microscopic, or molecular. Lipid and sugar were suitable for the non-fiber edible material. Heating transforms lipid into heat denaturalization, such as trans-fat. By heating such denaturalized lipid remains behind, and the original lipid with delicious structure disappears by a smoking phenomenon. So that such baked confectionery changes in quality and becomes fragile, as experienced generally. These phenomena could be prevented by maintaining a safe original structural body, by preventing overheat and heat denaturalization.

The following situation is suitable. The above edible non-fiber material contains lipid. The manufactured mixed edible material is solid, half-solid, or more viscous than the contained lipid at the temperature higher than a melting point of the said lipid ingredient. In the present invention, the sentence "solid, half-solid, or more viscous than the contained lipid at the temperature higher than a melting point of the said lipid ingredient" means "solid, half-solid, or more viscous than the contained lipid at the temperature that exceeds the melting point of the lipid ingredient to at least 1 degree of centigrade higher than a melting point of the said lipid ingredient".

The inventor paid his attention to a large quantity of water being maintained in jelly and agar gel without changing a melting point of original water. And then after zealous study, the following discovery and invention were made. By impregnating lipid to a dehydrated edible fiber mass, the suitable lipid-containing edible material was made, which is solid, half-solid, or more viscous than the contained lipid ingredient at the temperature higher than a melting point of the said lipid ingredient.

Vegetable oil is conventionally and generally used for margarine (including whip, spread, shortening) as replacements of such as butter, lard, etc. But generally speaking the vegetable oil has low melting point, and viscosity is insufficient to just use it for margarine. On this account the vegetable oil is processed by catalyst hydrogenation which raises a melting in order to make conventional margarine. However, the processed oil contains trans-fatty acid which is produced by catalyst hydrogenation. Now the fact that the trans-fatty acid hurts the health of the human body is pointed out in particular in the Europe, U.S.A, and Canada. From such present conditions the food processing industry has tried to raise the melting point and viscosity of oil by another method, but the ideal thing is not provided without using the process of catalyst hydrogenation. For example, as the margarine which do not use the processed oil and fats, lard of animal fats was suggested (Japan Patent Application 2001-238597). However, its advantage is hard to admit, because the margarine is originally a replacement of the lard, then the lard is recommended as a new replacement of the margarine. In addition, other many methods are known to make food spread by solidify water component which is made by emulsified vegetable oil of water-in-oil type (U.S. Pat. No. 4,226,895, U.S. Pat. No. 4,284,655, U.S. Pat. No. 5,409,727). However, it is necessary to use a preservative by these methods, and the storage for the long term is impossible. In addition, alkylated oil-soluble polymer (U.S. Pat. No. 4,284,655), polytetramethyleneglycol (U.S. Pat. No. 5,409,727), margarine which contains solidified vegetable oil by fatty-acid monoglycerides such as tree wax etc. (Japan Patent Application 2002-534070) were reported. But the safety of these oil-hardening ingredients as food is not guaranteed. In addition, there is the background where the lipid of the low melting point is healthy medically. Therefore vegetable oil of the low melting point is preferred to use. But where ordinarily-liquid oil is solidified by mixing it with high-melting point fat such as tree wax, the merit of low-melting point lipid disappears.

The obtained invented edible material by mixing the dehydrated edible fiber mass and the lipid becomes solid, half-solid, or more viscous than the original lipid at the temperature higher than the intrinsic melting point of the ingredient lipid. Inside of the edible material, seemingly, the lipid soak into the inside cavity of the mass of the edible fiber (edible fiber mass, as follows), where the edible fiber mass acts as a frame and the lipid component hardly go through away. In addition, it is suitable to mix the dehydrated edible fiber mass and the lipid in the melted state of the lipid.

Because this edible material is made by the lipid solidification with edible fiber mass, the lipid processed by catalyst hydrogenation is not necessary to use. In addition, it is not necessary to mix the lipid of the high melting point more to stiffen lipid. In addition, even a safe aspect is useful because the edible fiber mass can be made of an edible plant and animal origin. Therefore such edible material is safe for human body, and becomes solid, half-solid or more viscous than the original lipid at the higher temperature than the melting point of the ingredient lipid.

In addition, it is suitable that the edible material of this invention is chocolate or oil-and-fat food such as butter. For example, molten chocolate as the non-fiber edible material is mixed with the dehydrated edible fiber mass, the dehydrated edible fiber mass is soaked by the chocolate, and then the invented chocolate is manufactured. In addition, for example, molten butter as the non-fiber edible material is mixed with the dehydrated edible fiber mass, the dehydrated edible fiber mass is soaked by the butter, and then the invented butter is manufactured. Such chocolate and butter can maintain the form of solidity or half solidity at the higher temperature than the melting point of the ingredient oil and fat without the molten oil and fat flowing out. Some edible fibers make the mixed material solid, half-solid, or pasty at temperature of 30-200 degrees Celsius. On this account such chocolate and butter hardly melt in a tropical area and at the temperature of the summer, transportation and storage are easy, and, in addition, it is delicious even at the high temperature. As these chocolate and butter are heat-stable and do not lose shape by heat, these are suitably added to baked confectioneries. In addition, when the invented edible material is chocolate or butter, it is suitable that the edible fiber mass dissolves in the mouth. In such a case, when it is put into the mouth, dehydrated edible fiber mass dissolves, and the original food feeling and sensation of the ingredient chocolate and butter itself is provided.

In addition, oil-and-fat food such as margarine is suitable as the edible material of this invention. For example, vegetable oil as the edible non-fiber material is mixed with and soaked into the dehydrated edible fiber mass, and then the margarine of this invention is provided. As written above, the edible material of this invention becomes solid, half-solid, or more viscous than the original vegetable oil at the higher temperature than the melting point of the original vegetable oil without the processing of the catalyst hydrogenation. Then the vegetable oil becomes the edible material which has the suitable solidity as margarine without using processed oil or fat. In addition, edible plant and animal can be used as the original source of the edible fiber mass. This is useful in the aspect of security. And the healthy advantages of the oil with low melting point can be maintained because oil with low melting point can be stiffened without mixing the fat of high melting point.

In addition, this inventor discovered that extremely suitable edible material was provided when the mass of the starch fiber was used, after various kinds of the mass of dehydrated edible fibers ere examined.

In other words, the dehydrated starch fiber is suitable as the edible fiber in the invented edible material. The mass of the dehydrated starch fiber is stable at temperature of −20~200 degrees Celsius. The mixed edible material made of the mass of the starch fiber and the lipid can keep solid even at the temperature to exceed a melting point of the said lipid more than 100 degrees Celsius. In addition, it is stable even if oil, fat, and water are included in non-fiber edible material, because the starch fiber is hard to dissolve in both oil and water. On the other hand, the mass of the starch fiber is digested by amylase of saliva, so that it is immediately disintegrated if it is taken in a mouth. On this account, when the mixed edible material with the mass of the starch fiber and the lipid is taken in the mouth, the lipid immediately dissolves out. So that its food sensation is very similar to that of oil-and-fat food which dissolves in the mouth, such as margarine, butter, chocolate, etc. In addition, if it is starch, there is no problem about the safety, and it is cheap as a material. In addition, this can be used as oil-and-fat food of high lipid content such as butter etc. because solid edible material can be made even if the lipid is mixed with the comparatively little mass of the dehydrated starch fiber.

In addition, in the invented edible material, it is suitable that the above dehydrated edible fiber mass is form of cotton or form of sponge. If it is such a form, dehydrated edible fiber mass can impregnate a large quantity of edible non-fiber material, and the absorbed edible non-fiber material is hard to leak out. In addition, it is desirable for porosity to be more than 95% as for the dehydrated edible fiber mass. Although there are the some differences more or less depending on the edible fibers, when porosity is less than it 95%, dehydrated edible fiber mass aggregates tensely and is hard to handle. On the other hand, it is desirable for porosity to be equal to or less than 99.95% as for the dehydrated edible fiber mass. Although there are the some differences more or less depending on the edible fibers, the liquid lipid cannot be fully solidified in the case beyond 99.95%.

It is desirable for the edible material in this invention to include edible fiber equal to or less than a diameter of 200 μm. More desirably, the contained edible fiber is suitable when the diameter is equal to or lower than 50 μm, besides, when the diameter is 5~20 μm. Because if a diameter of the edible fiber is big, fiber sensation is felt, and smooth sensation cannot be provided. In addition, dehydrated edible fiber mass consisting of the diameter of 5-20 μm can suitably harden lipid.

In addition, in the above edible material, it is suitable that the dehydrated edible fiber mass is provided by lyophilization (freeze-vacuum-dry) of the edible fiber-containing substance such as water solution, sol, or gel. Because such edible fiber mass was dehydrated with almost no shrinking, porosity is high and advantageously a large quantity of lipid can be impregnated. For example, the above dehydrated starch fiber mass can be obtained by lyophilization of the starch water solution.

In addition, the invented edible material is suitable when a dehydrated fruit of Arecales Order is crushed, has edible fiber equal to or less than a diameter of 100 μm, and is mixed with lipid. Such edible material is solid, half-solid, or more viscous than the contained lipid at a temperature higher than the melting point of the contained lipid. In such an edible material, presumably, the edible fibers such as dietary fibers, etc. which are contained in the crushed fruit of Arecales Order work as a frame, and the ingredient lipid hardly oozes out.

In addition, such edible material is suitable for butter, chocolate, margarine, etc. so that smooth eating sensation is provided. This presumably comes from the thinness of the edible fiber with the fine diameter equal to or less than 100 μm. Because many edible fibers contained in a fruit of Arecales Order have bigger diameters more than 100 μm, it is desirable to use the crushed thinned fiber. For example, such butter is provided by mixing butter and the dehydrated crushed fruit of Arecales Order which contains edible fiber equal to or less than a diameter of 100 μm. In addition, the butter and chocolate provided in this way dissolve more hardly than the conventional thing. And its handling is easy and it can be suitably eaten even at a hot place where the temperature is high.

In addition, in the edible material of this invention, it is desirable for the above lipid to be liquid lipid at a normal temperature. With such edible material, the healthy lipid which is liquid at normal temperature can become solid, half-solid, or highly viscous without the processing of catalyst hydrogenation. Safe edible material can be obtained without using trans fat. In addition, as the above lipid which is liquid at a normal temperature the most healthy olive oil is suitable.

It is suitable that the edible material of this invention does not include processed oils and fats. Processed oils and fats are the oils and fats, the chemical structures of which were changed by processing with the chemical reaction. This concretely means the oils and fats which are processed by catalyst hydrogenation. The invented edible material keeps a state of solidity, half solidity, or higher viscosity than the original lipid at the temperature higher than the melting point of the original lipid, even if the lipid is not processed. Therefore it is not necessary to use the processed oils and fats with the fear to hurt health.

In addition, in the edible material of this invention, the lipid content is not limited in particular, but it is desirable for lipid content equal to or more than 30% by weight. More desirably, the lipid content is equal to or more than 80%. If the lipid content is equal to or more than 30% by weight, the invented edible material can be used for many oil and fat foods. If the lipid content is equal to or more than 80%, the invented edible material can be used for more oil and fat foods, such as margarine.

In addition, in the edible material of this invention, the edible non-fiber material is not a substance limited in particular, but it is desirable to contain edible oils and fats. Such edible material can be suitably used in oil and fat food. The content of edible oils and fats is not a thing limited in particular, but high content of the edible oils and fats is desirable. Because it can be used for more oil and fat food. Concretely the content of the oil and fat is desirably 30% or more by weight. Besides, 80% or more is more desirable.

In addition, the edible material of this invention can contain water, but no water is desirable. If it does not contain water, it is hard to be denatured, and the long-term shelf life is enabled.

In addition, in the edible material of this invention, it is suitable that the above edible fiber is plant gum paste.

The plant crude oil such as the soy bean crude oil contains innumerable nourishment which is necessary for the living body such as vitamins. But the thing marketed as bean oil is refined as only oils and fats, and all plant nourishment ingredients except oils and fats included in soy bean crude oil are removed as impurities. The vitamin E which is included a lot in soy bean crude oil is effective for living body such as skin etc., and the part becomes the patent of this inventor (Japan Patent 3657285). Especially as an ingredient of the crude oil, the plant gum paste, main component of which is phosphatide, is effective for the protection of the nerve cell and water preservation of the skin cuticle. Nevertheless this is removed in de-gum extraction into water in the refinement process of the crude oil.

When the molecules are observed, the phosphatides as the plant gum paste are different from the scattered disjointed triglycerides as oil and fat. Each phosphatide molecule has both cation of the strong basicity and anion of the strong acidity at the alpha end, and cooperatively connects with each other molecule. Such cooperative connections of the phosphatide molecules are made mainly by C—C bond, ionic bond and ester bond and build up big fiber aggregate with the ramification. Therefore, this fiber strongly hold non-fiber ingredient and work as the reinforcing rod fiber of the steel reinforced concrete building.

As a result of the zealous study of this inventor in order to utilize effectively the plant gum paste which is separated at the refinement stage of the vegetable oil, and was removed effectively, the plant gum paste was discovered to be very useful as an additive to various kinds of food.

The plant gum paste is liquid with high viscosity. And its mixture with various kinds of powder, or oil or fat which is liquid at normal temperature makes up the edible material which has the form of viscous liquid or paste. For example, the mixture with the oil or fat which is liquid at normal temperature can heighten and raise the viscosity of the ingredient oil or fat which is liquid at normal temperature. And then without using the processed oil or fat, margarine-like oil or fat food can be made. In addition, plant gum paste will cover a bittering agent, if it is mixed with bitter substance such as olive or powder medicine. Therefore this can be suitably used as an aid for taking food and medicine.

The plant gum paste is impurities such as phosphatides included in crude oil which is extracted from oil plant before the de-gum. It is separated and removed from plant crude oil by de-gum process of plant crude oil. For example, when the water is mixed and stirred with crude oil extracted from oil plant, water-soluble sediment separates. When this sediment is separated and taken, and then water is removed, the plant gum paste is provided.

In the above edible material, it is desirable for the content of the plant gum paste to be 1-60% by weight. When the content is less than 1% by weight, there is the case that an effect of the combination is not seen in. And when the content exceeds 60% by weight, it becomes too tense. As the plant gum paste, the soy bean gum paste of the soy bean origin is suitable. The soy bean gum paste is highly viscous paste in a temperature range of −40~100 degrees Celsius. When this is used, it is hard to melt, and delicious edible material is provided.

In addition, the invented edible material which is the mixture of the dehydrated edible fiber mass and the edible non-fiber material, is useful as biodegradable plastics and edible molding material.

For example, in late years biodegradable plastics attracts attention. Among these the biodegradable plastics which use starch begins to be widely used, because this is good for environment with de-oil. However, the conventional biodegradable plastics of starch uses granular starch (Japan Patent Application 2006-143887, Japan Patent Application 2006-9007). And the combination between starch particles is weak, and there is a fault not to be strong. In addition, such biodegradable plastics, when there is no water content, becomes the form of dried rice cake or flat glass. And then the plasticity disappears and the convenience as the plastic is lost. So that water must be incorporated, and then this makes the fault that it is easy to denature.

In contrast, this invented edible material becomes strong and moldable biodegradable plastics. It seems that the edible fiber mass works as a frame. In addition, such edible material contains no water, and is strong and moldable. Then the long shelf life becomes possible. In addition, the edible material of this invention is useful as an edible container, an edible sheet, and an edible thread. For example, the edible material of this invention becomes an edible container, when the dehydrated edible fiber mass is molded as the shape of the container and impregnated with the edible non-fiber material. And the edible material of this invention becomes an edible sheet, when it is pressed and molded to the sheet form. And the strong edible thread can be obtained, when the dehydrated edible fibers are twisted into the thread shape and soaked by the edible non-fiber mass.

In the edible material of this invention, it is suitable that above edible non-fiber material includes sugar. If the edible non-fiber material is sugar, the strong and highly moldable edible material can be obtained. It is thought that "sugar" suitably works as the concrete for the edible fiber mass working as the reinforcing rod. And "the sugar" indicates non-fiber-shaped monosaccharide or oligosaccharides.

In addition, the above edible fiber mass is suitable, when the included fiber has a diameter equal to or less than 200 μm. Such edible material becomes more moldable.

In the above edible fiber mass, it is desirable for the edible fiber to be fiber of starch kind. The dehydrated fiber of the starch kind is flexible and can be transformed in the same way as glass fiber. Especially, starch fiber equal to or less than a diameter of 200 μm, more desirably, equal to or less than a diameter of 50 μm, has suitable formability. On this account, for example, when the dehydrated starch fiber mass is freely molded to various shape and is soaked by the edible non-fiber mass, the biodegradable plastics of the desired shape can be obtained. In addition, starch is advantageous in that it is cheap. In addition, the dehydrated starch fiber mass is heat stable and hardly hygroscopic, and therefore highly stable.

In addition, the other subject of this invention is the above dehydrated starch fiber mass. Such dehydrated starch fiber mass can harden edible non-fiber material, especially oil and fat. And this is useful as oil and fat hardening agent. Especially, this is stable before taking it in a mouth, and this is dismantled when it is held in the mouth. Therefore utility is in particular extremely high as a hardening agent of esculent oil and fat.

In addition, in the edible material of this invention, it is suitable that above edible non-fiber material includes the palm kernel oil which is not changed by chemical reaction, and hydrophilic lipophobic substance.

Conventionally, oil and fat cannot be mixed with water, unless additives such as surfactants (emulsifiers) etc. are added. On this account a surfactant is added during manufacturing oil and fat food, where hydrophilic lipophobic substances such as powdered skim milk etc. is mixed with oil and fat. However, it is known that the mainly used soy bean-related surfactant causes the allergy.

As a result of zealous study, the inventor found that palm kernel oil easily mix with water. Conventionally as the oil and fat from oil palm, palm oil from the fruit is used, and the seed is disposed or used as feed or soap. However, the palm kernel oil provided from a seed of oil palm includes a very useful ingredient, and there are more nourishment ingredients than the palm oil from fruit. Nutritive value is very high in the palm kernel crude oil which is not refined, and value as the food is particularly high. Seed is the embryo of the root of the creature, and the inventor discovered high utility of the palm kernel oil including innumerable nourishment ingredients this time, and discovered that the palm kernel oil should be discriminatively and actively utilized in many aspects in future.

In other words, when the above edible non-fiber material in the edible material of this invention includes palm kernel oil, which is not changed by chemical reaction, and the hydrophilic lipophobic substance, it can produce the oil and fat food which is the mixture of the oil&fat and the hydrophilic lipolphobic substance without other surfactant. The hydrophilic lipophobic substance is not limited in particular if edible, but, for example, powdered skim milk is given. Using such edible material without adding a surfactant, the edible material which is the mixture of the oil&fat and the hydrophilic lipophobic substance can be obtained. Therefore, without using allergenic soy bean surfactant, the delicious and safe allergy-free food can be obtained, which is the mixture of the oil&fat and the hydrophilic lipophobic substance.

Conventionally, heated dehydrated edible material such as baked confectioneries etc. is heated around 200 degrees Celsius temperature. However, in the about 200 degrees Celsius temperature condition, the ingredient lipid is easy to be transformed to trans fat, and to be denatured by heat. And this is unfavorable for safety. However, when the baking temperature is simply lowered, the inside cannot be heated enough, and delicious food cannot be provided. In addition, internal water does not completely vaporize. And this is unfavorable to shelf life. In addition, it is said that baked confectioneries such as cookies become more delicious when there are more content of butter and oil& fat. By manufacturing methods such as cookies, conventionally and commonly the baking is at 170-180 degrees Celsius for 10-15 minutes. But at such baking temperature, most of butter and oil& fat vaporize and disappear during baking. In contrast, when the baking is done at 150 degrees Celsius for around 20 minutes, some butter and oil& fat remain, and it becomes more delicious. When the heating temperature is more lowered or the heating time is more shortened, water remains and mold grows during a save.

As a result of zealous study of this inventor, baking can be done at lower baking temperature than usual by adding lyophilization process, to the usual manufacturing method of lipid-containing baked confectionary, and to the usual manufacturing method of dehydrated baked confectionary. And thus a fresh lipid ingredient equivalent to concrete of a steel reinforced concrete structure sufficiently remains. And thus the lipid-containing baked confectionary is found to be able to be provided, which is tough, not fragile, delicious, and preservable for long time.

In other words, the edible material of this invention is suitably the dehydrated heated edible material which is manufactured by decompression process.

The dehydrated heated edible material of this invention is a heated manufactured substance and is not limited in particular. For example, there are baked confectionaries such as cookies, biscuits, etc. which are made by mixture of lipid and other materials and baking. The dehydrated heated edible material made by above manufacturing method is dehydrated from inside by lyophilization before baking. On this account water does not remain behind in the edible material, even if it is not baked in a conventional temperature condition. In addition, in a decompression process, the edible material is deflated and deaerated at the time of decompression. And at the time of the decompression end, heated air is filled up into the edible material. In such a repeated decompression process, even if the baking temperature is lower than conventional, the process can sufficiently heat to the inside of the edible material. Therefore, the dehydrated heated edible material, which is obtained by above manufacturing method, is good for health, because the method is different from convention and prevents the transformation to trans fat and heat denaturalization. The amount of denatured fatty acid is little, and this means good for health. During the baking, the lipid is hard to vaporize. Therefore the manufactured product is more delicious, tough, and not fragile. In addition, for example, the decompression drying process can be performed with a vacuum pump. When cookies are baked by the manufacturing method of this invention, the baking temperature is desirable concretely around 110-145 degrees Celsius, especially 130 degrees Celsius.

According to this invention, the edible material which is safe, tough and of stable shape can be provided.

BEST MODE

In this invention, the edible non-fiber material indicates all non-fiber-shaped edible material. This is not limited in particular, but as the edible non-fiber material, lipid is suitable. Particularly oil and fat is suitable.

In the edible material of this invention, edible fiber is not limited in particular. But the followings are exemplified. Starch group, polysaccharide group such as cellulose, agarose, etc., and fibers which mainly contain proteins such as gelatin, tofu, etc. In addition, fiber-shaped sugar etc. can be used.

In the edible material of this invention, fibers of starch kinds are suitable as the edible fiber. Fibers of the starch kinds are immediately dismantled with saliva when it enters the mouth. Therefore they have the excellent eating sensation. They are suitably cheap as the material. The fiber mass of the starch kinds of this invention indicates the fiber-shaped starch kinds which come from a variety of plants and the derivatives of the starch kinds.

For example, dehydrated edible fiber mass can be obtained by the dehydration of the water solution and sol&gel of above polysaccharides and proteins. In this case lyophilization is desirable for the dehydration method. Because by the lyophilization, thin fibers spread and cotton- or -sponge-formed edible fiber mass can be obtained which can impregnates a large quantity of lipid. And the porosity of the dehydrated edible material is regulated by the density of the edible fiber of a water solution and sol& gel.

In addition, as for the starches, only a solid material can be obtained, if the water solution is simply dried. but if the starch water solution is lyophylized, the cotton-shaped starch fiber mass can be suitably obtained, because the starch molecules form network structure in the water and maintain the network structure during the drying. The cotton-shaped starch fiber mass produced in this way is made of the fibers with the diameters equal to or less than 30 μm and mainly 5 μm-20 μm. Such edible material made of above starch fiber mass is extremely suitable at a cost and a point of a eating feeling. The density of starch water solution doing lyophilization is, desirably, higher than 0.1% (0.1 g/ml) and is equal to or less than 0.8%. Such dehydrated edible fiber mass made from the water solution of such a density range can sufficiently solidify the liquid lipid, hold suitable softness, and melt well in the mouth. In addition, other than above method of lyophilization of the water solution, sol etc., the dehydrated edible fiber mass can be made, when each single edible fiber is dehydrated and gathered.

In addition, it is suitable that the edible material of this invention is made by mixing the lipid and the dehydrated crushed fruit of Arecales Order, which contains the edible fiber of the diameter equal to or less than a diameter of 100 μm.

As the dehydrated crushed material of Arecales Order, the followings are exemplified: The crushed material of the dry copula (an albumen part of the fruit of the coconut palm), the crushed material of the seed of the oil palm, etc. Crushed fruit residue after oil extraction can be used. In the crushed fruit of Arecales Order, desirable diameters of the contained edible fibers are equal to or less than a diameter of 100 μm, more desirably equal to or less than a diameter of 50 μm. The fiber-shaped sensation is felt on the tongue when the fiber diameter is more than 50-100 μm, but smooth taste sensation on the tongue is provided if the diameter of the edible fiber is less than that. In addition, the use of a roll mill is suitable to crush the edible fiber which is contained in the fruit of Arecales Order into the diameter equal to or less than 50 μm.

The combined quantity of the dehydrated crushed fruit of Arecales Order is not a thing limited in particular. But around 100 g~10 g are desirable for lipid 100 g to mix. When the quantity of the crushed fruit of Arecales Order or olive is less than 5 g, the combination effect can not be occasionally seen. And when it is more than 100 g, the mixture becomes hard.

In addition, the crushed fruit of Arecales Order can be mixed with water more than about 1,000 times quantity, and can be use as a strong and safe surfactant. And for example, the soap which is made from the natural oil such as palm oil etc. by saponification with sodium hydroxide etc. is conventionally known. But the surfactant of this invention does not receive such a chemical process, is cheap, and highly safe to the human body. In addition, this surfactant decreases surface tension and interfacial tension, and has detergency, emulsification power, dispersion power, penetration, lathering power, etc. And this can be used for many purposes as follows. An emulsifier, a cleaner, a bubble digestive, a sterilizing preservative, antifoaming agent, dispersant, solubilizer, penetrant, moisturizer, a lubricant, softener, an antistatic agent, bubble bath, textile finishing agent, floating sorting agent, a lubricating oil additive, etc.

In addition, it is suitable for the edible material of this invention that it is from the dehydrated edible porous solid which contains the edible fiber, and the soaked lipid which is held in above edible porous solid.

The edible porous solid of this invention means any edible material which has many pores, and is not limited in particular. Examples are dehydrated substances as follows. Fruits, vegetables, layer, cereals, meringue, egg white, agar, jelly, tofu, konnyaku, apricot stone tofu, nata de coco, sugar, cotton candy, corn syrup, starch-containing confectionaries, etc.

The vegetables and fruits are as follows. An onion, a tomato, a cucumber, marrow cabbage, a strawberry, a melon, a watermelon, a banana, an apple, a peach, a loquat, a kiwi, a grape, an olive, a fruit of Arecales Order, etc. For the olive, even an unripe green olive and even a ripe black olive are not discriminated. But it is suitable to use the dry fruit. The cereals are suitably, rice, corn, barnyard grass, millet, amaranth, or wheat. These are preferably dehydrated by lyophilization, pongashi process, or pop. Because by the lyophilization, the internal pore space becomes big, and larger quantity of lipid can be soaked. And these can be cut into pieces of suitable size before use.

In addition, it is suitable that the edible porous solid in this invention dissolves in the mouth. In such case the edible fiber mass dissolves, when it is held in the mouth. So that very similar eating sensation of the soaked lipid itself can be obtained. The edible porous solid is the dehydrated substances as follows: Egg white, meringue, and cotton candy. The dehydrated egg white, cotton candy, and meringue have small mass per the volume (specific gravity), and more lipid can be impregnated. Therefore it is useful for manufacturing the food of high lipid content (such as the margarine which contains lipid more than 80% by weight).

In the edible material of this invention, it is desirable that the lipid is filled the inside space of the edible porous solid with. Because the content of the lipid decreases when air is mixed. On this account, in the above edible material, it is desirable that the edible fiber mass is impregnated by the melted lipid under a deaeration condition with a vacuum pump. Using such method, almost all of the inside space of the edible fiber mass is filled with lipid.

In the edible material of this invention, other seasonings such as salt or the sugar can be incorporated into the dehydrated edible fiber mass and edible non-fiber material. These can be added before mixture of the dehydrated edible fiber mass and edible non-fiber material. And these can be added after the mixture also.

In the edible material of this invention, the lipid is not limited in particular, but, for example, palm kernel oil, coconut oil, olive oil, soy bean oil, rape oil, these mixtures etc. are given. In the present invention, it is suitable that the lipid is liquid at normal temperature. The lipid which is liquid at normal temperature means that the lipid has a melting point lower than 30 degrees Celsius and is edible. And this is not limited in particular. This is exemplified as follows. Olive oil, soy bean oil, rape seed oil, etc. Olive oil in particular is suitable in this. In addition, even if this contains a lipid which is solid at normal temperature as the partial ingredient, this is regarded as the lipid which is liquid at a normal temperature, if this shows fluidity at normal temperature as a whole. In addition, it is more suitable that the above edible material contains the substance which has astringent. In addition, it is more suitable that the above edible material contains acid. In addition, in the above edible material, it is suitable that the above acid is vitamin C. In addition, it is suitable that the above edible material contains the salt (which is the product of chemical reaction of base and acid). In addition, it is suitable that the salt is sodium chloride in the above edible material.

In addition, with an above ingredient, the lipid can be stiffened more effectively by using a material having the astringent. A material having the astringent is a material having bitterness ingredients such as tannin, oleuropein, etc. And, for example, an olive, an astringent persimmon, tea (including oolong tea, black tea, etc.), wine, etc. are given. Especially the olive and the astringent persimmon can be suitably used. And conventionally it was approximately impossible to eat an olive or an astringent persimmon without destroying the astringent. But in the edible material of this invention, this bitterness disappears almost completely. Therefore this can be eaten without decreasing the nutrition such as astringent etc.

The quantity of combination of the material having the astringent is not a thing limited in particular. But around 10~50 g are preferable for lipid 100 g. There is the case that an effect by the combination is not seen in when a material having the astringent is less than it 10 g. And there is a case to give bad influence to taste when it exceeds 50 g.

In addition, with an above ingredient, the lipid can be stiffened more effectively by using acid. For example, vitamin C, citric acid, malic acid, lactic acid, tartaric acid, acetic acid, buoy chin acid, glutamic acid, aspartic acid, nicotinic acid, vitamin A acid, an amino acid, inosinic acid, nucleic acid, etc. are given. Vitamin C can be suitably used for the acid in particular.

The quantity of combination of the acid is not a thing limited in particular, but around 0.5-5 g are preferable for lipid 100 g. There is the case that an effect by the combination is not seen in when acid is less than it 0.5 g, and there is a case to give bad influence to taste when it exceeds 5 g.

In addition, with an above ingredient, the lipid can be stiffened more effectively by using the salt. The salt is a reaction product with acid and base. It is exemplified as follows: sodium chloride, magnesium chloride, magnesium sulphate, calcium sulphate, a potassium sulfate, calcium carbonate, etc. Especially sodium chloride is suitably used.

The quantity of combination of the salt is not a thing limited in particular, but around 1~10 g are preferable for lipid 100 g. There is the case that the combination effect is not seen in when salt is less than 1 g. And there is a case to give bad influence to taste as the food when it exceeds 10 g.

In addition, the edible material of this invention can be used as margarine group. And it can be adjusted and used as margarine group by adding seasonings. In addition, it is preferable to assume it a small piece of around several millimeters because it is hard to take out a small quantity. In addition, as the lipid is soaked into the edible fiber mass, the flow of the lipid is suppressed. And the surface area where the lipid contacts with the outside space becomes small. In addition, the water and air can be removed from the inside by dehydration and deaeration. Therefore the denaturalization and oxidation of the lipid can be controlled low. And the shelf life can be long. As stated above, in the conventional margarine group, processed oil and fat which are stiffened by manufacturing process such as catalyst hydrogenation etc. of plant oil and fat are used. But this processed oil and fat contains the trans fat which is produced by the hydrogenation process. Such substances have a threat to hurt the health of the human body remarkably. In contrast, the oil and fat food of this invention contains no processed oil and fat. And the low-melting point lipid which is liquid at normal temperature can be used as it is without any alteration. Therefore its safety for the human body is very high.

In the present invention, with "margarine group", it points at margarine, spread, shortening, whip, and the similar oil&fat food. The margarine indicates oil&fat food which contains oils and fats equal to or more than 80%. And the spread and whip point at the oil&fat food which contains oils and fats less than 80%. Margarine, spread, and whip are mixed with water, powdered milk, and salt. The shortening is the oil&fat food which contains approximately 100% oils and fats. And the shortening does not include water and dairy products. The margarine group of this invention include all of these substances and the replacements of these.

In the present invention, with "butter group", it points at butter, margarine, and the thing which is similar to butter and margarine. And in the present invention, with "chocolate group", it points at chocolate, chocolate confectionary, and a chocolate replacement, etc.

In addition, the food of this invention uses above edible material. And for the above food, it is suitable that it contains above oil& fat food, cereals, legumes and/or to contain oil cake. And it is suitable that the above food is confectionery. In addition, it is suitable that the above confectionery is prepared after a crush process to crush materials to particles, the diameters of which are equal to or smaller than 3 mm. And it is suitable that the above confectionery is prepared after a decompression or lyophilization process.

In addition, above oil and fat food can be used as a replacement of butter and margarine in the confectionery such as a chocolate cake, cookie, etc. where butter and margarine are used. For example, a sweet roll, a cake, a baked confectionery, etc. are nominated for such a cake other than a chocolate and a cookie.

The chocolate confectionary uses a cacao. But the chocolate confectionary can be produced by using the edible material of this invention as a substitute for cacao. For example, the roasted palm nucleus, coconut, palm fruit, unpolished rice, rice bran and plant fruit are mixed with the edible material of this invention. And nuts, cereals, dried fruits etc. can be appropriately added and mixed.

For the chocolate confectionary with the edible material of this invention, it is desirable to use natural oil plant tissues or plant fruits, such as the crushed dry copula, palm nuclei, etc. And in this case, it is desirable that the diameters of the crushed ingredient fibers are equal to or less than 100 μm, particularly equal to or less than 50 μm. Tongue sensation becomes smooth when fibers are crushed and the their diameters become equal to or less than 100 μm.

In addition, the chocolate backup materials can be obtained which present a flavor of the chocolate, by roasting the fruit of the plant except the cacao and coffee. For example, the crushed copula or palm nucleus, rice bran, or crushed unpolished rice, etc. And these chocolate substitute materials do not contain caffeine unlike the cacao powder. Therefore it prevents arteriosclerosis and sleep disorder. And it is very useful for the children and the patients who are prohibited caffeine intake. Furthermore, it is cheap. After oil extraction, the coconuts, copula, palm nuclei, etc. are conventionally disposed or become feed. These industrial wastes can be effectively utilized advantageously. On this account, the chocolate confectionary of this invention can suitably use above chocolate substitute materials.

In addition, the cacao butter has much oleic acid and linoleic acid contents, and an iodine number is high as 35~40. On this account, by the heating of long time such as roast and tempering at the time of the chocolate production, it is easy to produce denaturalization and transformation. In contrast, for example, the coconut has very small iodine number as 8~9.5. Therefore this is stable and can be stocked for years in normal condition. In addition, the coconuts come to have high melting point of the chocolate after having roasted it. The melting point of the palm nucleus is 29 degrees Celsius. The melting point of the coconut is 24 degrees Celsius. In addition particularly, fermentation treatment with three kinds of bacteria such as Aspergillus, yeast, and lactic-acid bacteria improves the chocolate flavor desirably.

Table 1 shows the melting points (m.p.), iodine numbers, saponification numbers, and shapes which exist in the neighborhood of those of the coconut and cacao.

TABLE 1

| value | coconut | oil palm seed | cacao | oil palm fruit |
|---|---|---|---|---|
| m.p. | 21~25 | 26~30 | 30~35 | 27~42.5 |
| iodine no. | 8~9.5 | about 15 | 35~40 | 53~57 |
| sapon. no. | 255~258 | about 247 | 188~195 | 200~205 |
| seed diameter | 14 cm | 2 cm | 2 cm | 2 cm |

Butter or margarine is usually put into the cookie as oil and fat. The edible material of this invention can be used as a substitute for butter and margarine to produce cookies. For concrete example, with normal combination ingredients such as wheat flour (rice flour), an egg, the sugar, etc., the edible material of this invention is mixed and baked for manufacturing the cookies. And nuts, cereals, pops, dry fruits, etc. can be added and mixed appropriately.

In addition, in the cookie which are made of the edible material of this invention, it is preferable to use the natural oil plant tissues such as the crushed dry copula. In this case, sufficient crushing until the fiber diameter becomes equal to or less than 100 μm, especially equal to or less than 50 μm, is desirable. The copula becomes much more delicious by the crushing.

In addition, in the cookie using the edible material of this invention, can use bean-curd refuse can be suitably used. The cookie which contains bean-curd refuse is advantageous in that it can utilize the bean-curd refuse which is industrial waste effectively. When the bean-curd refuse is used, the particularly delicious cookie can be obtained by using the wheat flour and rice flour in the ratio of 1/4~4/1 (the mass ratio) rather than use only the wheat flour or only the rice flour. In addition, the followings can be suitably used the same as the bean-curd refuse: soy sauce lees, shouchu lees, sake lees, seedcake such as sesame seedcake, rape seedcake, etc., cereals bran such as rice bran etc.

The baked confectioneries such as cookies are generally produced at 170-180 degrees Celsius for 10-15 minutes. But in such condition, the almost all butter, oil and fat of the ingredients vaporizes and disappears. In contrast, some butter, oil and fat remain a little and the confectionaries become more delicious, when they are baked at 150 degrees Celsius, around 20 minutes. But when the heating temperature or time falls than this, water is left and there is the case that mold grows during a save. In addition, the cookie which combined an ingredient with much fiber such as bean-curd refuse or the rice bran is usually tense very much. In order to solve these problems, lyophilization and the autoclave which heat inside and outside equally with the vacuum pump are used for heating sterilization at 130 degrees Celsius. Then butter, oil, and fat remain as it is intact. And the mold does not grow. And non-fragile and delicious cookie can be provided. The cookie which uses materials with many fibers such as bean-curd refuse powder or the rice bran is very tense even if the content is as little as only around 4%. Therefore this is marketed with thinness of around the half of the usual cookie. For such situations, it can be crushed into the diameters equal to or less than 3 mm, preferably 0.5 mm before baking. And then it can be gathered together lightly and baked. Then it becomes soft and easy to be lyophilized.

In addition, the edible material of this invention can be used as the helping composition for taking food and medicine. The helping composition for taking food and medicine is to help the food and medicine, which are, for example, not tasty food and restorative, bitter medicine, etc.

For such purpose; conventionally the drink for deglutition assistance is used (for example, Japan Patent Application-1999-124342). Because it is gelatinous water solution, the expiration date passes briefly, and the gel gradually separates and finally changes into watery solution. In addition, it must be used within one week after the container cap is opened even if it is stored in a refrigerator. The container has a specialized spout, is expensive and futile. In contrast, the edible material of this invention does not need water. So that, the refrigeration is not necessary. The shelf life can be long at room temperature. Therefore this is superior in preservability as compared to the conventional helping composition for taking food and medicine.

When furthermore acid ingredient is mixed to the edible material of this invention, this becomes more suitable as the helping composition for taking food and medicine. Because it is hard to come to feel bitterness on the tongue by combining the acid ingredient. It becomes easy to take specially bitter medicine and food. The followings are exemplified as the acid ingredient: vitamin C, citric acid, malic acid, lactic acid, tartaric acid, acetic acid, phytin acid, glutamic acid, aspartic acid, nicotinic acid, vitamin A acid, amino acid, inosinic acid, nucleic acid, etc. Especially vitamin C is suitably used.

In margarine group, the wide range of the plasticity, fine texture, gloss, spread, and wide range of the melting point become important. The mixture of many ingredients is necessary to solve these problems.

The thing which has the mixture of many ingredients is a germ cell in the world of creatures and is a seed in plant kingdom.

The oil and fat which are extracted from a palm seed are called palm kernel oil. This palm kernel oil is cheap and has few double bonds. Therefore it is suitable for the edible lipid of this invention.

Not the part of the seed, it is necessary to use not a part of but the whole seed. This means whole grain. It is desirable nutritionally.

In these series of products, it becomes the whole grain of the Arecales Order.

In the case of plant generally, the intact plant crude oil just after picking must be refined, except sesame oil (homepage of Kagawa-shodoshima agricultural experimental station). For example, deodorization handling through the heating steam around 220 degrees centigrade under decompression that is almost a vacuum, heating process to about 150 degrees centigrade to vaporize out solvent, heating process to 120 degrees centigrade for effective compression and extraction, etc.

The reason why the heating processes are done in a refinement stage in this way is to separate oil&fat ingredients effectively. However, the crude plant oil has useful natural ingredients of the living body other than oils and fats. But these living body ingredients are denatured destroyed by this heating. As for these living body ingredients, centrifugal separation was possible without heating plant crude oil. In addition, crystallization of the living body ingredients can be done by wintering according to a room temperature change and refrigeration. And the crystallized substances can be filtered and separated with cloth etc. Furthermore, they can be more completely separated, when the oils and fats are wrapped in cloth and compressed similar as tofu making.

These can be applied to seaweed in disfavor with moisture such as dry layer.

When the layer is wrapped a rice ball with, or is touched to rice, immediately it absorbs moisture and makes the tongue sensation bad.

The tight damp-proofing is necessary to store layer.

However, when this layer go through in high melting point palm oil beforehand, it can stay in condition to be dry without absorbing water forever. It is deliciously eaten as a dry cracker sheet.

When the layer is added a small amount such as 1% of starch is added to and dried, the delicious taste is reinforced.

Followings are embodiment and more detailed explain of this invention, but this invention is not a thing limited to this.

At first this inventor tried to make solid or half-solid edible material at normal temperature by mixing the dehydrated edible fiber mass and the liquid lipid at normal temperature.

Embodiment 1

A 0.2% starch water solution (a 0.2 g/ml starch water solution) was dried by lyophilization. And dehydrated edible fiber mass consisting of the starch fiber was obtained. This starch fiber mass made form of cotton and held almost same shape as the shape of the water solution before the lyophilization. And when the starch fiber mass was observed microscopically, the starch fiber was fiber has diameters of 5-20 μm, mainly 5-10 μm. The porosity of the dehydrated edible fiber mass was about 99.8%.

The dehydrated edible fiber mass consisting of the above starch fiber was mixed with extra virgin olive oil (EVO oil). And the edible material of embodiment 1 was obtained. Here, 100 w/t parts of EVO oil soaked into three w/t parts of dehydrated edible fiber mass.

The provided edible material of embodiment 1 was solid. And it had higher property of the shape holdout than the original dehydrated edible fiber mass and the original EVO oil before the mixture. In addition, the edible material of embodiment 1 was similar like margarine in the appearance and softness. It dissolved in the mouth immediately when held in the mouth. It had the taste of the EVO oil. The taste of the starch fiber was not felt. In addition, the eating sensation was similar to margarine. And the eating sensation of the starch fiber was not felt. It is thought that starch fiber was thin and dissolved in the mouth. The above-mentioned result shows that the edible material of embodiment 1 can be used as margarine. In addition, the edible material of embodiment 1 is made of the olive oil and starch which are not processed. And its safety is high and it is healthy.

The edible material of embodiment 1 was hard to serve with small quantity. But the thing which it was easy to serve was provided, when the cotton-shaped dehydrated edible fiber mass was cut into small pieces of the several millimeters beforehand and mixed with EVO oil. Feeling of taste and eating sensation were like embodiment 1.

When the edible material of embodiment 1 was refrigerated, the edible material held the suitable solidity at 25~−20 degrees Celsius. When the edible material of embodiment 1 was heated, the edible material held the suitable solidity at 25~200 degrees Celsius. The surface of the edible material was baked to wheat brown.

In the edible material of embodiment 1, the EVO was exchanged by rape oil (rough oil and refined oil) and sesame oil, and then another edible material was made. With the refined rape seed oil, 100 w/t parts of the oil and 3 w/t parts of the dehydrated edible fiber mass of the starch were mixed to be half-solid. With the crude rape seed oil and the sesame oil, 100 w/t parts of the oil and 2 w/t parts of the dehydrated edible fiber mass of the starch were mixed to be half-solid. Even if these edible material were refrigerated to −20 degrees Celsius, it kept form of half solidity.

Embodiment 2

With the density of starch water solution as 0.05%, 0.1%, 0.2%, 0.4%, 0.8%, 1.6%, 3.2%, 6.4%, and 12.8%, the inventor made lyophilization and got dehydrated edible fiber mass of the cotton form consisting of the starch fiber. When each dehydrated edible fiber mass was mixed with EVO oil, solid edible material was provided for all dehydrated edible fiber mass. Retentivity of the EVO oil was low in the edible material which used starch water solution of 0.05% and 0.1% as compared with other %. And the dehydrated edible fiber mass obtained from the starch water solution of the density equal to and higher than 1.6% was hard and hard to mix with EVO oil. Each edible material was tried to eat and held in the mouth. It immediately dissolved in the mouth when the density was equal to or less than 0.8%. Especially when the starch water solution has the density equal to or less than 0.2%, the melting in the mouth was very good. EVO oil can be suitably hardened with dehydrated edible fiber mass by the lyophilization of the starch water solution as above. From the above result, the density higher than 0.1% and equal to or less than 0.8% is desirable for a starch water solution. Especially the starch water solution of about 0.2% density is suitable.

The dehydrated edible fiber masses obtained by the lyophilization of 0.05% and 2% starch water solutions were observed by microscope. In the 0.05%, most starch fibers has the diameters of 3-8 μm and mainly 5 μm. In the 2%, most starch fibers has the diameters of 10-30 μm and mainly 20 μm.

Embodiment 3

Agar and EV Olive Oil

Like above embodiment 2, the water solutions of the agar, board gelatin, and konnyaku were made as follows: 0.05%, 0.1%, 0.2%, 0.4%, 0.8%, 1.6%, 3.2%, 6.4%, 12.8%. And these were lyophilized to make the cotton-shaped dehydrated edible fiber masses of the agar fiber, gelatin fiber, konnyaku fiber. Solid edible material was provided of all the dehydrated edible fiber mass, when each dehydrated edible fiber mass was mixed with EVO oil. The edible material made from the agar water solution was evaluated from retentivity of the EVO oil, hardness, and the dissolution speed in the mouth. The result shows that the thing which used the 0.4% agar water solution was suitable.

Embodiment 4

Board Gelatin and EVO Oil

Similarly each edible material made from the water solution of the board gelatin was evaluated. The thing which used a 0.2% board gelatine water solution was suitable.

Embodiment 5

Konnyaku and EVO Oil

Similarly each edible material made from the konnyaku water solution was evaluated. The thing which used a 0.1% konnyaku water solution was suitable.

The edible material of the above provided embodiment 3-5 kept the form of solidity at temperature of −20-200 degrees Celsius and was usable as margarine.

Embodiment 6

The 97 w/t parts of EVO oil was mixed with 3 w/t parts of cotton candy (34 mg/ml). The cotton candy impregnated with EVO provided the edible material of implication embodiment 6.

The edible material of embodiment 6 kept the form of solidity at temperature of −20-30 degrees Celsius and can be used as margarine. When it was hold in the mouth, the sugar fiber dissolved and EVO oil melted immediately. Slight sugar taste appeared.

Embodiment 7

I made 0.02%, 0.05%, 0.1%, 0.2%, 0.4%, 1%, sugared water solution of 2% and got cotton-shaped dehydration possible appetite fiber aggregate by doing lyophilization of each water solution. The possible food which was similar to embodiment 6 was provided when I mixed these with EVO oil.

The cotton candy of the embodiment 6 and each dehydrated edible fiber masses of the embodiment 7 were observed by microscope. The sugar fibers of the embodiment 6 have the diameters of 5-25 μm and mainly 5 μm. The sugar fibers of the embodiment 7 which are made from the water solution of any density have the diameters of 5-15 μm.

Embodiment 8

The starch water solution of 0.2% was lyophilized and the cotton-shaped dehydrated edible fiber mass consisting of the starch fiber was obtained. The butter (water is 16% by weight) was heated to 50 degrees Celsius and liquefied. And above dehydrated edible fiber mass was added to the liquefied butter little by little. At first, the dehydrated edible fiber mass adsorbed the yellow pigment of the butter. The dehydrated edible fiber mass 3 w/t parts was added to the butter 100 w/t parts. Then the fiber part which adsorbed butter became yellow. And the neighboring part of the liquid butter which was not adsorbed became thinner yellow. Then the dehydrated edible fiber mass was sequentially added until 5 w/t parts for the butter 100 w/t parts. Then all the butter was adsorbed.

The above provided edible material (the butter group) of the embodiment 8 did not changed the form nor the hardness nor the color even if it was heated to 150 degrees Celsius. A thermocoagulation lump has begun to be made in the edible material when it was heated to 160 degrees Celsius. The state was same as 160 degrees Celsius at 180 degrees Celsius. Then the baked color did not come out on the surface. It became brown at 200 degrees Celsius.

Embodiment 9

Here the procedure was the same as the embodiment 8 except that the starch water solution of 0.2% was changed into the agar water solution of 0.4%. And the agar fiber mass soaked by butter was obtained as the edible material of the embodiment 9 (butter group). The edible material of embodiment 9 maintained the form of solidity at −20-200 degrees Celsius. It became brown at 200 degrees Celsius.

As the same as the embodiment 8, the cotton candy and the molten butter were mixed. Then the sugar fiber of the cotton candy dissolved. It is thought that it dissolved in the water included in the butter.

The above-mentioned result suggests that non- or hardly-water soluble edible fiber is suitable, when the edible non-fiber material of this invention contains the water.

The EVO oil and the edible materials of the embodiment 1, 3, and 6 which contain EVO oil concerned were tried by 20 panelists (men and women of 19-57 years old). Then the differences of the eating sensation and taste of the EVO oil and the edible materials of the embodiments were evaluated according to the following standards. The average mark of all panelists are shown in table 2. In addition, the butter and the edible materials of the embodiment 8 and 9 which contain the butter concerned were tried by the same panelists. Then the differences of the eating sensation and taste of the butter and the edible materials of the embodiments were evaluated according to the following standards. The average mark of all panelists are shown in table 3.

* No change Two points * Slight difference One point * Great difference Zero point

TABLE 2

|  | embodiment 1 | embodiment 3 | embodiment 6 |
|---|---|---|---|
| eating sensation | 2.0 | 0 | 1.0 |
| taste | 2.0 | 2.0 | 1.0 |

As shown in table 2 with the edible material of the embodiment 1 containing starch fiber, the eating sensation and taste were almost same as EVO oil. Because the agar fiber in embodiment 3 does not dissolve in the mouth, it is thought that the difference of the eating sensation appeared definitely. Sugar fiber of the embodiment 6 melts in the mouth. But it is more obstinate than the starch fiber. Therefore it is thought that a difference of the eating sensation was slightly felt. In addition, when the sugar fiber of the embodiment 6 melted, sugar sweetness was added to the taste of EVO oil. And then this is felt by panelists presumably.

TABLE 3

|  | embodiment 8 | embodiment 9 |
|---|---|---|
| eating sensation | 2.0 | 0 |
| taste | 2.0 | 2.0 |

The eating sensation and taste of the embodiment 8 are almost same as the butter as shown in table 3. Because the agar fiber of embodiment 9 does not dissolve in the mouth, it is thought that a difference of the eating sensation appeared definitely.

Embodiment 10

Here the procedure was the same as the embodiment 8 except that the butter was changed to the chocolate. And the dehydrated edible fiber mass consisting of the starch fiber was soaked by chocolate. Then edible material of the embodiment 10 (chocolate group) was obtained.

In the case of chocolate, the dehydrated edible fiber mass was enough just to add two w/t parts for 100 chocolate w/t parts. Such edible material was solid at the temperatures equal to or less than 40 degrees Celsius. And it became half-solid, could be molded freely, and could maintain the form, when it was heated to 50 degrees Celsius. The form and the color did not changed even if it was heated to 180 degrees Celsius. The half solidity was kept and it could be picked up with chopsticks. It was smoothly eaten. And the minute starch fiber liquefied with the saliva amylase of the mouth immediately. It became blackish brown at 200 degrees Celsius.

Embodiment 11

Here the procedure was the same as the embodiment 8 except that the butter was changed to the ice cream. And the dehydrated edible fiber mass consisting of the starch fiber was soaked by the ice cream. In the case of the molten ice cream at room temperature, the dehydrated edible fiber mass was necessary to add 6 w/t parts for 100 ice cream w/t parts. Above obtained edible material did not change the form of solidity even if it was heated. And the component water boiled at 100 degrees Celsius. With the above the form of solidity did not change even if I heated provided possible food, and component water boiled at 100 degrees Celsius. It became the rather hard gel state by the boiling dehydration. Furthermore, it began to become yellowish-brown, when it was heated to 150 degrees Celsius. Then it changed to the shape of brown sweet caramel at 180 degrees Celsius.

By the lyophilization of the 0.2% starch water solution, the cotton-shaped dehydrated edible fiber mass was obtained. EVO oil 1,200 g, crushed dry copula 600 g, powdered skim milk 110 g, salt 20 g, and vitamins C 10 g were mixed. Furthermore, these mixtures were mixed with above dehydrated edible fiber mass 60 g for the impregnation.

Above edible material of the provided embodiment 12 has the appearance same as margarine, and both the taste and the eating sensation were the same as margarine. In addition, this edible material had the form of hardness solidity like the margarine at room temperature. And any big change was not seen in hardness at neither 200 degrees Celsius nor −20 degrees Celsius. When such edible material was baked on white bread with an oven, the bread surface was baked to light-brown. The edible material on the bread kept the totally same form. And the surface was baked to light-brown. And it was very delicious to eat.

Embodiment 13

The 0.2% starch water solution was lyophilized. Then the cotton-shaped dehydrated edible fiber mass consisting of the starch fiber was obtained. EVO oil 1,600 g, powdered skim milk 310 g, salt 20 g, and vitamins C 10 g were mixed. Furthermore, the mixture was mixed with above dehydrated edible fiber mass 60 g for the impregnation. The above obtained edible material of the embodiment 13 had similar property as the edible material of embodiment 12.

Embodiment 14

The meringue was dried by lyophilization. Then a sponge-shaped porous solid was obtained. This was sunk into EVO oil and impregnated with the EVO oil in decreased pressure by a vacuum pump.

Embodiment 15

The marshmallow was dried by lyophilization. Then a sponge-shaped porous solid was obtained. This was sunk into EVO oil and impregnated with the EVO oil in decreased pressure by a vacuum pump.

Embodiment 16

The layer was dried by lyophilization. Then a sponge-shaped porous solid was obtained. This was sunk into EVO oil and impregnated with the EVO oil in decreased pressure by a vacuum pump.

Embodiment 17

The egg white water solution of 20 percents by weight was dried by lyophilization. Then a sponge-shaped porous solid was obtained. This was sunk into EVO oil and impregnated with the EVO oil in decreased pressure by a vacuum pump.

Above provided edible material of the embodiment 14-17 was solid at the temperature of −20~40 degrees Celsius. And this could be used as margarine. And the edible material of embodiment 14 and 17 was soft and easy to melt in the mouth. Therefore they were suitable as margarine. In addition, as for the dry seaweed such as the layer which is used in the embodiment 16, the good eating sensation like the thin dry crunch cracker is important to continue for a long time. To this end, the oil of Arecales Order is particularly effective among oils. Furthermore, it became more effective, when the layer was spread with starch and dried. The quantity of starch was necessary for more than 0.1% of the layer. The more quantity of the starch was there, the more crunch of good sensation was there. The effect was weak when the quantity was less than 0.1%. Light, smooth, and dry sensation in the mouth is preferred for the oil. Therefore the lipid of Arecales Order is suitable.

Embodiment 18

The pop rice (swollen rice) was dried by lyophilization. Then a sponge-shaped porous solid was obtained. This was sunk into EVO oil and impregnated with the EVO oil in decreased pressure by a vacuum pump.

Embodiment 19

The popcorn (swollen corn) was dried by lyophilization. Then a sponge-shaped porous solid was obtained. This was sunk into EVO oil and impregnated with the EVO oil in decreased pressure by a vacuum pump.

Embodiment 20

The bran was dried by lyophilization. Then a sponge-shaped porous solid was obtained. This was sunk into EVO oil and impregnated with the EVO oil in decreased pressure by a vacuum pump.

Above provided edible material of the embodiment 18-20 was solid at the temperature of −20~40 degrees Celsius. And this could be used as margarine. And the edible material of embodiment 14 and 17 was soft and easy to melt in the mouth. Therefore they were suitable as margarine. As compared to the weight of the original material, the weight of the absorbable EVO oil was as follows: 10.4 times quantity (pop rice), 5.4 times quantity (popcorn), 5.3 times quantity (caramel corn), 2.8 times quantity (sugar popcorn), 1.0 times quantity (bran), 0.26 times quantity (a marshmallow). And particularly pop rice was effective.

Embodiment 21

The onion was dried by lyophilization. Then a sponge-shaped porous solid was obtained. This was sunk into EVO oil and impregnated with the EVO oil in decreased pressure by a vacuum pump. It became the very delicious high quality cooking ingredient. When it was cut to small pieces of around one or two mm, it became the delicious margarine.

Embodiment 22

The tomato was dried by lyophilization. Then a sponge-shaped porous solid was obtained. This was sunk into EVO oil and impregnated with the EVO oil in decreased pressure by a vacuum pump.

Embodiment 23

The cucumber was dried by lyophilization. Then a sponge-shaped porous solid was obtained. This was sunk into EVO oil and impregnated with the EVO oil in decreased pressure by a vacuum pump.

Embodiment 24

The kale was dried by lyophilization. Then a sponge-shaped porous solid was obtained. This was sunk into EVO oil and impregnated with the EVO oil in decreased pressure by a vacuum pump.

Embodiment 25

The strawberry was dried by lyophilization. Then a sponge-shaped porous solid was obtained. This was sunk into EVO oil and impregnated with the EVO oil in decreased pressure by a vacuum pump.

Above provided edible materials of the embodiments 21-25 were solid at the temperature of −20~40 degrees Celsius. And they became the new foods which had the unprecedented new taste and eating sensation. And they were different from the contained vegetables or fruits. And the inside EVO oil contained no water and no air. Therefore the shelf life could be long. When they were cut to the small pieces of a few mm size, they became easy to take out and could be used as margarine. Furthermore, because water and the air which were originally included in vegetables and fruits were exchanged for EVO oil, it was hard to produce deterioration by the corruption, etc. And they were stable and could be stocked for a long term in that condition. Conventionally the kale, the marrow cabbage, is famous in particular as green juice. Its nutritive value is high. But it is known that it is bitter and its taste is very bad. However, the kale just after the collection was sweet and delicious. When the fresh kale was lyophilized, it became sweet and very delicious food without bitterness. Then the highly nutritious kale became easy to take.

Then this inventor tried to harden the liquid lipid at normal temperature, using the crushed fruit of Arecales Order as an example.

Only the hard husk of the coconut was removed. And the copula (the albumen part of the coconut) and coconut juice were crushed together by a roll mill. And the obtained crushed material was dried by a vacuum pump. Above obtained dried crushed material contained lipid (oils and fats) and became the pate-shaped material.

Even this pate-shaped material was usable as margarine group (margarine, shortening). The diameters of the fibers included in the dried crushed material were equal to or less than 100 μm when the dried crushed material was observed with a microscope.

Embodiment 26

Above dried crushed material 20 percents by weight was mixed with the palm kernel oil 58 percents by weight, powdered skim milk 20 percents by weight, and salt 2 percents by weight. Above obtained edible material of embodiment 26 became a very good product as the margarine group at the points of taste, eating sensation, etc.

Embodiment 27

In the above edible material of the embodiment 26, the component ratio of the dried crushed material and the palm kernel oil was changed to make others. The provided mixed material was more suitable as margarine group (margarine, shortening) than the non-mixed dried crushed material of the coconut only. The content of the dried crushed material 1-77% by weight and the content of palm kernel oil 77-1% by weight was usable as margarine group. But, at the component ratio of embodiment 26, the best material was provided as margarine group.

Embodiment 28

Above dried crushed copula 600 g was mixed with coconut oil 1000 g. Intact pure coconut oil has low melting point of 21-25 degrees Celsius. Therefore it is cloudy fluid. But the above edible material of the embodiment 28 was in an enough hardened condition.

Embodiment 29

Coconut oil 2.0 g and one oil palm seed 1.6 g were crushed by a roll mill. Above obtained edible material of the embodiment 29 was in an enough hardened condition like the embodiment 28. The fibers of the edible material were equal to or less than a diameter of 100 μm when the edible material of the embodiment 29 was observed with a microscope. In addition, the edible material stiffened enough at 2.5 g, when the coconut oil was changed to the coconut oil fraction of high melting point.

Embodiment 30

Coconut oil 8 g, dried crushed copula 6 g, soy bean gum paste 0.5 g, refined sugar 6 g, powdered skim milk 4.5 g, vitamins C 0.1 g were mixed.

The above edible material of the embodiment 30 was whip-shaped at 30 degrees Celsius, even though the processed oil or fat was not contained.

In addition, it was very delicious and was able to just use this edible material as margarine such as whip, etc. In addition, at normal temperature, its stability was able to save it for a long term. The reason is thought that water is not included in this edible material. In addition, it had the form of hard paste which showed viscosity in a range of –40-100 degrees Celsius. And it could be used as whip in the wide temperature range. In addition, this edible material has the color of clean butter yellow.

In addition, the above edible material of the embodiment 30 became powerful, safe, new, and very delicious surfactant. The edible material of the embodiment 30 was mixed with water of 1000 times quantity at normal temperature and observed. Even after one day elapsed, the edible material and the water did not separate and held the mixture. The plant tissue with high lipid content such as oil plant etc. necessitates the lipophilic group coming in contact with lipid in the living body. And the tissue must have the hydrophilic group too at the same time, because all the tissues necessitate water. The substance having the both groups in this way becomes the surfactant. Even the dry copula and the dry oil palm fruit could be crushed and well mixed with water up to 1 to 1 weight ratio. And the mixture did not separate even after three hours stay. In other words, these dry fiber tissues of the oil plant acted as surfactants. In addition, this surfactant decreases surface tension and interfacial tension, and has detergency, emulsification power, dispersion power, penetration, lathering power, etc. And this can be used for many purposes as follows. An emulsifier, a cleaner, a bubble digestive, a sterilizing preservative, antifoaming agent, dispersant, solubilizer, penetrant, moisturizer, a lubricant, softener, an antistatic agent, bubble bath, textile finishing agent, floating sorting agent, a lubricating oil additive, etc.

Coconut oil and the dried crushed copula were mixed with equal weight. The above obtained edible material could be mixed with water of 10 times quantity without separating.

Embodiment 31

Extra virgin olive oil (EVO oil) 2 g, dry crushed copula 3 g, powdered skim milk 1.2 g, salt 0.16 g, and vitamins C0.04 g (quantity of total lipid 62.5%) were mixed. Above obtained edible material of embodiment 31 could be usable as margarine group on the taste and the eating sensation.

Embodiment 32

Dry immature green olive (except the seed) 0.7 g and EVO oil 0.6 ml were mixed and crushed (quantity of total lipid 65%).

Embodiment 33

Dry mature black olive (except the seed) 0.85 g and EVO oil 0.6 ml were mixed and crushed (quantity of total lipid 65%).

The above edible materials of the embodiment 32 and 33 were usable as margarine group (spread) on the taste and the eating sensation. As different from general EVO paste, the fibers and particles were small and fine. And the material had gel form similar like margarine and shortening. And it contained no water. Therefore it can be stable and stocked at normal temperature for a long term. In the above edible material of the embodiment 32 and 33, EVO oil was changed to the wintering sediment of the EVO oil. Then, the big difference was not seen in taste and eating sensation. The olive was easy to be crushed after the lyophilization.

Embodiment 34

Coconut oil 7 g, dry crushed copula 2.5 g, powdered whole milk 2.38 g, soy bean gum paste 0.5 g, and salt 0.16 g were mixed (quantity of total lipid 80%).

Embodiment 35

Palm kernel oil 6.2 g, dry crushed copula 3 g, powdered skim milk 1.2 g, soy bean gum paste 0.4 g, salt 0.16 g, and vitamins C0.04 g were mixed (quantity of total lipid 80%).

The above edible materials of the embodiment 34 and 35 were good as margarine on the taste and the eating sensation. And it could be stocked at normal temperature for a long term. The reason is thought that this did not contain water. When the edible material 100 g of the embodiment 34 and 35 was added with water 5-10 g, the edible material was stiffened more. The degree of the hardening could be regulated by the added water amount appropriately.

Embodiment 36

Dry copula was crushed with a roll mill. And the contained fiber became equal to or less than a diameter of 50 μm. And coconut oil 1 kg, soy bean gum paste 100 g, soy bean crude oil 100 g, powdered skim milk 170 g, salt 20 g, and vitamins C 10 g were added to and mixed with the obtained dry crushed copula 600 g.

The above obtained edible material of the embodiment 36 has a melting point 27 degrees Celsius. And this could be used as margarine. The fiber of the dry crushed copula had diameter equal to or less than 50 μm. Therefore, there was no feeling of a tangible substance on the tongue and the smooth feeling on the tongue. Then new deliciousness which was not present so far appeared.

In the composition of the embodiment 36, the soy bean crude oil (melting point –10~–16 degrees Celsius) were changed to palm stearin (melting point 50-55 degrees Celsius). Then it seemed that the melting point rose. But on the contrary, the melting point dropped to 23 degrees Celsius in the reverse. It was thought that soy bean crude oil was suitable when I the softness at the low temperature was considered.

Embodiment 37

Dry crushed copula 480 g, coconut oil 600 g, powdered skim milk 36 g, powder sugar 480 g were mixed.

The above edible material of the embodiment 37 could be used as margarine group (whip or spread). By changing the coconut oil quantity or adding other oil and fat, the hardness could be regulated appropriately. In addition, when cocoa powder was appropriately added, it became similar like chocolate. But double quantity of the cacao powder was necessary, because the coconut taste defeated the cacao taste.

The dry crushed copula used in the embodiment 36 was roasted.

The above edible material became the form similar to chocolate. Its taste became similar like mixture of cocoa and coffee. When it was lightly roasted to the color of bright light brown, the taste was insufficient. And the enough roast was suggested to be necessary. In addition, the above crushed copula and oil palm seed were frozen and crushed with a millcer. Then they were mixed with the same amount of the wet bacteria such as Aspergillus, yeast, and lactic-acid bacteria. Then, they were fermented at 30 degrees Celsius for five days. Then, their taste became delicately bitter and delicious. In addition, when they were roasted, they became more delicious without bitterness. In addition, they became more delicious by using these three kinds of bacteria all together than each bacteria alone. When the roast was made strong, the coffee taste disappeared.

Embodiment 38

The roasted dry crushed copula of the embodiment 36 was added with appropriate amount of oil& fat, sugar, and milk. The above obtained edible material of the embodiment 38 became more delicious than the roasted dry copula. And it could be usable as a chocolate replacement.

Embodiment 39

The edible material of the embodiment 37 was roasted. The above obtained edible material of the embodiment 39 became similar like chocolate. It had the middle taste of the chocolate and the coffee. In addition, the powder sugar of the embodiment 37 was changed to the black sugar. When it was roasted, it became the delicious edible material with dark chocolate color. In addition, taste was not good when the roast was insufficient.

The oil palm seed was crushed with a roll mill until the contained fiber became equal to or less than a diameter of 50 μm. And the obtained crushed seed of the oil palm was roasted. The above obtained edible material became to have the color and form similar to chocolate. It had the taste of chocolate mixed with a little coffee.

Embodiment 40

The above crushed seed of the oil palm was roasted and added the oil&fat, sugar, and milk of appropriate amount to. The above obtained edible material of the embodiment 40 was more delicious than the roasted crushed seed of the oil palm. And it was suitable as margarine group. In addition, the edible material of the embodiment 40 was mixed with the edible material of the embodiment 37. This became to have the taste similar like the chocolate.

Embodiment 41

The edible material of the embodiment 37 was mixed with roasted rice bran 5% by weight.

Embodiment 42

The edible material of the embodiment 37 was mixed with roasted unpolished rice 5% by weight.

The above edible materials of the embodiments 41 and 42 were similar like chocolate at the taste and form.

As above, coconut copula, oil palm seed, rice bran, and unpolished rice were roasted and could be the chocolate replacement which presented a chocolate-like flavor. These did not include the caffeine which caused arteriosclerosis and the sleep disorder. These were different from the cacao which was chocolate material. Therefore these were very useful for the children and the patients who were prohibited caffeine intake. After oil extraction, the coconut copula etc. are disposal or feed. Therefore these are very cheap. In addition, it was advantageous in that the industrial waste can be effectively used.

Embodiment 43

Soy bean gum paste 95.5 g, powdered whole milk 30 g, dry crushed copula 30 g, and salt 2 g were mixed (quantity of total lipid 80%).

Embodiment 44

Soy bean gum paste 80 g, powdered skim milk 17 g, salt 2 g, and vitamin C 1 g were mixed (quantity of total lipid 80%).

Embodiment 45

Soy bean gum paste 55 g, soy bean crude oil 25 g, powdered skim milk 17 g, salt 2 g, and vitamins C 1 g were mixed (quantity of total lipid 80%).

The above obtained edible material of the embodiment 43-45 became similar like margarine having the wild taste and fragrance.

Embodiment 46

EVO oil 4 g, soy bean gum paste 4 g, powdered skim milk 1.85 g, salt 0.1 g, vitamin C 0.05 g were mixed (quantity of total lipid 80%). The above edible materials of the embodiment 46 was good as margarine replacement on the taste and the eating sensation.

Embodiment 47

Palm kernel oil 1.41 kg, soy bean gum paste 100 g, soy bean crude oil 100 g, powdered skim milk 370 g, salt 20 g, and vitamin C 10 g were mixed. The above edible material of the embodiment 47 was good as margarine replacement on the taste and the eating sensation.

Embodiment 48

Bean-curd refuse 650 g, wheat flour 600 g, crushed fine granules of the diameters 1.5-0.2 mm 550 g that I crushed to particle diameter 1.5-0.2 mm, sugar 550 g, whole egg 225 g, and the edible material of the embodiment 47 (margarine) 300 g, and dry crushed copula 200 g was mixed and baked to cookies.

The above bean-curd refuse cookie of embodiment 48 was very delicious. As the cereals, wheat only or rice only was not so good. When they were mixed in the weight ratio of 1/4~4/1, especially 1/1, it became more delicious. As compared with pure concrete, mixed concrete with gravel becomes stronger. Similarly, as compared with pure rice powder or pure wheat powder, mixed powder with crushed granules of around 1.5-0.2 mm diameters becomes not only stronger but also cheaper less than 10% and better for the tongue feeling like the pear and nut. When the crushed rice diameter was bigger than 1.5 mm, the foreign body sensation became too strong. When it was smaller than 0.2 mm, the meaning of the existence faded. The consumed amount in the total weight was suitable at 3-30%, especially 10%. If there was more than 30%, the taste was not good. And if there was less than 3%, the effect was weak.

In addition, in embodiment 48, a good cookie was provided even if rice bran and olive oil cake in substitution for bean-curd refuse. Some bitterness remained in the cookie of olive oil cake. But when the edible material of the embodiment 37 was spread on the surface of the cookie, the bitterness disappeared completely. In addition, for example, when the olive was mixed with yeast 0.2% and sugar 0.6%, and maintained at room temperature for one week, the taste became mellow by the fermentation pre-treatment. Then it became easy to use as a cooking ingredient of many aspects.

Embodiment 49

Bean-curd refuse 1 kg, wheat flour 500 g, crushed rice granules of 1.5-0.2 mm diameter 300 g, sugar 550 g, whole eggs 450 g, the edible material of the embodiment 37 (margarine) 300 g, and dry crushed copula 200 g were mixed and baked to the cookie.

The above bean-curd refuse cookie of the embodiment 49 became the light taste in comparison with the cookie of embodiment 48.

When the cookie was made by the same way as embodiment 49 without the bean-curd refuse, the taste became more different plain deliciousness.

Embodiment 50

Bean-curd refuse 1.5 kg, wheat flour 250 g, crushed rice granules of 1.5 mm-0.2 mm 250 g, sugar 500 g, edible material of the embodiment 46 (margarine) 300 g, and dry crushed copula 200 g were mixed and baked to the cookie.

The above bean-curd refuse cookie of embodiment 50 increased bean-curd refuse in quantity. But it was delicious.

In the embodiment 50, when the rice was decreased to 50 g, it became sticky and the tongue feeling was not good. And when the dry crushed copula was not included, the cookie body became fragile and easy to break, and the taste declined.

Embodiment 51

Bean-curd refuse 1 kg, sugar 200 g, and the edible material of the embodiment 47 (margarine) 200 g of embodiment 47 were mixed and baked to the cookie.

The above bean-curd refuse cookie of the embodiment 51 did not contain wheat nor rice. Therefore, there was little crunchy feeling, but it was delicious.

Then, the thickness of the cookie of the embodiment 51 was made more than 4 mm. In that case, the dry surface provided cracker feeling. And the inside of the cookie became juicy with oil. Such cookies were made only through the following steps conventionally. At first, the coating surface was made. Then, the juicy material was put into the inside. Then the surface was closed. However, the cookie of this invention was made through the following simple steps. All the materials including the margarine were mixed, divided into small pieces, and baked. Then such two-layered cookies were made. In addition, similar two-layered cookies could be obtained even when the used cereals were only wheat or rice.

As for the cookie of this invention, the thickness of about 1 cm was easy to eat. And cacao mixture made them delicious. When cocoa 150 g was added, coconut taste became weak. Therefore, double quantity of coconut became necessary.

The cookies of this invention were stable with no change, after one-month closed stock without desiccant, and after one-year closed stock with desiccant. In considering the long shelf life and egg allergy, the embodiments 50 and 51 were baked until the surface became brown a little without the egg. These were also delicious. These cookies are particularly useful as non-perishable food for disaster, etc. Because, these cookies contain the followings as the raw materials: The bean-curd refuse has a lot of nutrition and fibers which are good for stomachache and bowel movement. The edible material (which has no processed oil and fat) has a long shelf life and is safe for the human body. The milk powder has very high nutritive value. The vitamin C is easy to be deficient.

Embodiment 52

Roasted rice bran 650 g, wheat flour 600 g, crushed rice granules of 1.5-0.2 mm diameter 550 g, sugar 550 g, whole eggs 225 g, edible material of the embodiment 47(margarine) 600 g, and dry crushed copula 200 g were mixed and baked to the cookie.

The above rice bran cookie had a chocolate-like flavor. And it was very delicious. In addition, it was like the bean-curd refuse cookie of the embodiment 51. The dry surface provided cracker feeling. And the inside of the cookie became juicy with oil.

As described above, the various liquid oil and fat at normal temperature can be stiffened with the oil plant tissues such as copula, etc. And the margarine substitute food, which is obtained by this way, could be effectively used as the raw materials of the confectionaries, such as chocolate, cookie, etc.

Embodiment 53

The palm kernel oil was mixed with water of various quantity. If the quantity of the mixed water was equal to or less than 20 ml, the palm kernel oil 100 ml could be well mixed without separating.

As comparison examples, the followings were mixed with various quantity of water: palm oil, rape oil, sesame oil, soy bean oil, sunflower oil, EVO oil, rice oil, and grape seed oil. These oils and fats could not be well mixed with any quantity of water. These were separated and did not mixed with water.

This result suggests that the palm kernel oil shows extremely strong surfactant activity among liquid oils at normal temperature. Unlike the fruit part which is a mesocarp of simple composition, the seed, which is a source of new life birth, has many complicate ingredients, as widely seen in the world of creatures. It seems that this is reflected on the ability difference of well mixing water.

Embodiment 54

Powdered skim milk 3.7 g, refined sugar 5.0 g, and vitamins C 0.1 g were mixed with palm kernel oil 10 ml. Powdered skim milk, refined sugar and vitamin C are hydrophilic oil-phobic materials, but were dissolved in the palm kernel oil without separating.

The above edible material of the embodiment 54 was good at both taste and tongue feeling. In addition, this edible material could be mixed with water of 20 ml without separating. When it was mixed with water of 30 ml, the edible material did not completely mix with water. And it showed slight separation. The total volume of the powdered milk, refined sugar and vitamin C, which were mixed with the edible material, was around half the volume of the palm kernel oil. Therefore, this edible material can be mixed with about 1.3 times water of the total volume without separating.

The above edible material of the embodiment 54 was used as the helping composition for taking food and medicine. When various kinds of medicines and foods were tried and taken as the real examples, all of them became very easy to be taken. For example, it was known that the rhubarb powder was particularly bitter and unsavory among the medicines. But this became easy to be taken. In addition, the followings became easy to be taken: garlic, red pepper, mugwort powder, onion, leek, orange-peel, green pepper, carrot, cabbage, kale, and bitter gourd. Furthermore, babies, children, etc. could easily and safely eat hateful food by mixing the material. In addition, old people frequently have the problem that powder and granules of the medicine get into the gap of the false teeth. But such problem could be prevented with the edible material. The proteins such as the milk, etc. have strong buffer action, for the sake of the living body defense for various kinds of alien substances and stimulants. The inventor reported protein articles in European and American publications. Yamada: Analytical Biochemistry 164 (1987)170-174. J Biochem Biophys Methods 7 (1983)175-185.8 (1983)175-181.8 (1983) 183-188. Advanced Methods. Biochemical & Clinical Apparatuses (1983) De Gruiter.

In addition, the edible material of the embodiment 54 weakened bitterness on the tongue feeling by containing the vitamin C as the acid ingredient. Therefore, the medicine and food, which have very strong bitterness, could be easily taken. In addition, the edible material of the embodiment 54 has no water. Therefore, refrigeration is not necessary. And shelf life more than one year was possible at room temperature. The bitterness has the receptor on the root part of the tongue, and tends to have opposed properties to the acidity physicochemically and neurologically.

Yamada: Brain Research 142 (1978)187-190.172 (1979)165-168. Neuroendocrinology 18 (1975)263-271. Nature 247 (1974)284-286

Therefore the acid taste is added.

Embodiment 55

Palm kernel oil 50 g and powdered skim milk 25 g was mixed.

The above edible material of the embodiment 55 was half solid of the degree to dissolve by the body temperature. And this was, as it was, usable as the oil and fat food. And, in addition, the edible material was usable as the helping composition for taking food and medicine.

Then the effectiveness of the above edible material of the embodiment 55 was evaluated. Commercial butter 50 g was used as the compared example 1. The palm kernel oil 50 g was used as the compared example 2. Blood samples were collected before and after the intake of each oil-and-fat food. Then the blood concentration changes of each component were measured.

<Examination Contents>

After 18 hours fast, the subject took each oil&fat food. Blood samples were collected as follows: before the intake, (1 hour after the intake), 3 hours after the intake, 6 hours after the intake, 12 hours after the intake, and 24 hours after the intake. Then the concentration change of following various ingredients in the blood were measured. In addition, the measurement considered circadian rhythm and the blood was collected at the same time of the day. The values in each Table show the numerical value of the changed quantity. i.e. The real measured value before the intake was deducted from each real measured value.

1. Triglycerides (TG) mg/dl

TABLE 4

|  | after 3 hr | after 6 hr | after 12 hr | after 24 hr |
| --- | --- | --- | --- | --- |
| embodiment 55 | +14 | +32 | −6 | 0 |
| example 1 | +13 | +55 | +19 | +28 |
| example 2 | +5 | +4 | +1 | +15 |

The edible material of the embodiment 55 and palm kernel oil showed very low TG increase. The edible material of the embodiment 55 showed rapid TG absorption and rapid disappearance from the blood.

2. High Density Lipoprotein (HDL) % Good Cholesterol Ratio

TABLE 5

|  | after 3 hr | after 6 hr | after 12 hr | after 24 hr |
| --- | --- | --- | --- | --- |
| embodiment 55 | −0.4 | 0 | +1.1 | −1.0 |
| example 1 | 0 | −0.8 | −1.1 | −1.0 |
| example 2 | +1.1 | +0.5 | −0.7 | −0.4 |

The butter of example 1 decreased HDL ratio (good cholesterol ratio) at all points. In contrast, the edible material of the embodiment 55 increased HDL ratio after a little delay. Palm kernel oil showed early increase. As compared with butter, two others are healthy.

3. Very Low Density Lipoprotein (VLDL) % very Bad Cholesterol ratio

TABLE 6

|  | after 3 hr | after 6 hr | after 12 hr | after 24 hr |
| --- | --- | --- | --- | --- |
| embodiment 55 | 0 | 0 | 0 | 0 |
| example 1 | +1 | +2 | −2 | 0 |
| example 2 | −1 | −2 | 0 | +2 |

The butter of example 1 increased VLDL ratio (very bad cholesterol rate) in the early hours. In contrast, the edible material of the embodiment 55 did not show any change of VLDL ratio. Palm kernel oil showed early decrease and late increase.

4. Total Cholesterol (TCh) mg/dl

TABLE 7

|  | after 3 hr | after 6 hr | after 12 hr | after 24 hr |
| --- | --- | --- | --- | --- |
| embodiment 55 | −14 | −5 | +6 | +28 |
| example 1 | +10 | +9 | +14 | +10 |

Butter of the example 1 increased TCh from the early hours. In contrast, the edible material of the embodiment 55 showed early effectiveness for TCh.

5. Uric Acid (UA) mg/dl

TABLE 8

|  | after 3 hr | after 6 hr | after 12 hr | after 24 hr |
| --- | --- | --- | --- | --- |
| embodiment 55 | −1.9 | +0.1 | −0.1 | +0.5 |
| example 1 | −0.2 | −0.1 | +0.6 | +0.5 |

In comparison with the butter of example 1, the edible material of the embodiment 55 decreased uric acid.

6. Lactate Dehydrogenase (LDH) IU/1, which Rises by Cancer, Liver Disease, Heart Disease, Cerebrovascular Accident, etc.

TABLE 9

|  | after 3 hr | after 6 hr | after 12 hr | after 24 hr |
| --- | --- | --- | --- | --- |
| embodiment 55 | −8 | −20 | −7 | −4 |
| example 1 | +6 | −2 | +5 | −9 |

In comparison with the butter of example 1; the edible material of the embodiment 55 decreased LDH.

7. Platelets ×10,000/Cubic mm, which Work as Glue in Order to Coagulate the Blood, and are Rapidly Coagulated and Consumed at the Disordered site, such as Arteriosclerosis, etc. Obstacle

TABLE 10

|  | after 1 hr | after 3 hr | after 6 hr | after 12 hr | after 24 hr |
|---|---|---|---|---|---|
| embodiment 55 | 0 | −0.8 | 0 | +0.9 | +2.5 |
| example 1 | −5.4 | −1.7 | +2.2 | +0.9 | +1.1 |
| example 2 | −0.6 | −0.5 | −0.1 | +2.5 | +0.9 |

In comparison with the butter of example 1, the edible material of the embodiment 55 and the palm kernel oil did not show a big change.

In addition, the following blood concentration changes were measured: glutamic-pyruvic transaminase (GPT), γ-glutamyl tranpeptidase (γ-GTP), amylase, and C-reactive protein (CRP). But the big change was not seen.

As shown above, the edible material of the embodiment 55, which was prepared with palm kernel oil and powdered skim milk, showed the recognized effectiveness as the oil and fat food.

Embodiment 56

Margarine 200 g, coconut 200 g, wheat flour 200 g, fragmented rice 200 g, powdered rice 200 g, sugar 200 g, bean-curd refuse 400 g, starch 100 g, egg yolk one were mixed and molded. Then the molded material was lyophilized (decompression dehydration process). Then the dehydration under the decompression and the baking of 130 degrees Celsius under the increased pressure were repeated with a dry heat autoclave. Then the cookie of the embodiment 56 were provided. In addition, as compared example, the above molded material was baked for 10 minutes at 170-180 degrees Celsius with an oven. Then the cookie of the compared example was provided.

The above cookie of the embodiment 56 had more oil and more deliciousness than the compared cookie. And the cookie of the embodiment 56 had similar shelf life as the compared example.

Embodiment 57

Margarine 100 g, bean-curd refuse 250 g, the mixture of rice Aspergillus, yeast, and lactic-acid bacteria 200 g, wheat flour 200 g, coconut 200 g, and egg yolk one were mixed and molded. Then the molded material was baked to the cookie by the same way of the embodiment 57. In addition, as compared example, the same molded material was baked at 170-180 degrees Celsius for 10 minutes with an oven. Then the compared cookie was provided.

The above cookie of the embodiment 57 had more oil and more deliciousness than the compared cookie. And the cookie of the embodiment 57 had similar shelf life as the compared example.

In addition, the mixture of rice Aspergillus, yeast, and lactic-acid bacteria and the various whip and chocolate were mixed at weight ratio 1 to 2. And when this was added to and mixed with the embodiment 56 and 57, they became more delicious. The fermentation produced many kinds of food resolution products. And this made suitably moderate softness at −20~25 degrees Celsius. The mixture of Aspergillus, yeast, and lactic-acid bacteria was mixed with EVO oil, palm kernel oil, and coconut oil, respectively, at weight ratio 1 to 1. Then the tree kinds held suitable softness at −20~25 degrees Celsius. The Aspergillus only did not make such good taste. The Aspergillus and yeast only did not make such good taste, too. In addition, the finely crushed copula and soy bean gum paste had strong surfactant activity. And their use made good mixability. Then the margarine group (whip group was included) and the ice cream group, which had suitable softness and hardness from low temperature to room temperature, could be prepared.

Embodiment 58

In the edible material having reinforced concrete-like structure, the dry starch fiber was used in substitution for a reinforcing rod of the steel reinforced concrete. The sugar was used in substitution for concrete. The starch water solution of 0.2% was lyophilized. Then the cotton-shaped dehydrated edible fiber mass of starch fiber was prepared.

The above dehydrated edible fiber mass of the embodiment 58 could be made to free form and free size. The fiber mass with 2 mm thickness was pressed under the pressure of 1 kg/cm2. Then it became the sheet of 0.05 mm thickness. Such sheet-shaped fiber mass could be used to write characters with a ball-point pen, the same as the paper made from pulp. When the sheet-shaped dehydrated edible fiber mass was held in the mouth, it tasted sweet and dissolved with saliva.

Embodiment 59

Corn syrup (75% density) was added in a starch water solution of 0.2%, mixed, and lyophilized. This produced the cotton-shaped edible material of the embodiment 59, which consisted of the dehydrated edible starch-fiber mass and the corn syrup which is sugar. Generally, the corn syrup is made with 75% density in production.

The above edible material of the embodiment 59 was sweet and was very delicious. In addition, like the dehydrated edible fiber mass of embodiment 58, it could become the sheet shape. When the corn syrup was added more than 3 ml to the starch 1 g in weight, the adhesiveness and water absorptivity became strong. And it became hard to handle it.

Embodiment 60

Sugar was dissolved to become 0.1% in a starch water solution of 0.2%. Then the lyophilization was performed. This produced the cotton-shaped edible material of the embodiment 60, which consisted of the dehydrated edible starch-fiber mass and the sugar.

The above edible material of the embodiment 60 became firmer plastic as compared with the dehydrated edible fiber mass of the embodiment 59. In addition, like the dehydrated edible fiber mass of embodiment 58, it could become the sheet shape. The obtained sheet-shaped edible material was firmer than the embodiment 58. So that it was easy to write a character with a ball-point pen on it. The above edible material of the embodiment 60 was sweet and was very delicious. When the added sugar quantity was changed, the fiber mass was delicious up to 80 times of the weight. It was too firm when it exceeded 80 times.

The aggregate that quantity of addition of the sugar was delicious to 80 times of the weight of the starch was provided when I changed quantity of addition of the sugar. I was too tense when I exceeded 80 times.

Embodiment 61

Starch water solution of 0.2% was lyophilized. And cotton-shaped starch fiber mass was obtained. This fiber mass was twisted with fingers to thread shape. This dehydrated edible fiber mass of the thread shape had the diameter about 1 mm. This tolerated 5 g tensile force.

Embodiment 62

The thread-shaped edible material with the diameter about 1 mm was obtained from the embodiment 59 by the same way of the embodiment 61.

The thread-shaped edible material of the embodiment 62 was measured how much tension could be tolerated. The corn syrup 2 ml was mixed with the starch 1 g. Then it tolerated the tension up to 105 g. When the syrup was 1 ml, the tension was 195 g. When the syrup was 0.5 ml, the tension was 455 g. When the syrup was 0.25 ml, the tension was 425 g. When the syrup was 0.1 ml, the tension was 335 g. When the syrup was 0.05 ml, the tension was 160 g.

As shown above, when the corn syrup around 40% was mixed with the dehydrated edible corn-fiber mass of thread shape, it could tolerate about 100 times tension. The reason of this strengthening is thought that the corn syrup builds a bridge between parallel starch fibers like the S—S bond between parallel protein fibers.

Embodiment 63

The thread-shaped edible material with the diameter about 1 mm was obtained from the embodiment 60 by the same way of the embodiment 61.

The thread-shaped edible material was measured how much tension could be tolerated. When the sugar was added 10 times quantity of the starch, it tolerated the tension up to 75 g. When the sugar was 5 times, the tension was 130 g. When the sugar was 2 times, the tension was 205 g. When the sugar was 1, the tension was 215 g. When the sugar was ½, the tension was 225 g. When the sugar was ¼, the tension was 185 g. When the sugar was ¹⁄₁₀, the tension was 80 g. And when the sugar was added equal to or more than 5 times quantity of the starch, the fiber became fragile.

EMBODIMENT 64

The corn syrup, the quantity of which is ¼ quantity of the starch, was added and mixed. And from this, the thread-shaped edible material of the embodiment 61 was made. Then molten palm stearin was impregnated into it. Then the thread-shaped edible material of the embodiment 64 was provided.

The above dehydrated edible fiber mass of the thread shape was measured how much tension could be tolerated. When the palm stearin of half the quantity of the dehydrated edible fiber mass was impregnated, it tolerated the tension up to 175 g. When the palm stearin of 1.3 times quantity of the dehydrated edible fiber mass was impregnated, it tolerated the tension up to 325 g. The lipid made a little bit weaker tension than the above sugars. But the sufficiently stronger tension was made than the original intact dehydrated edible fiber mass of the thread shape. The palm stearin has wax-like hardness. Therefore the relationship of the palm stearin and the dehydrated edible fiber mass is similar like the relationship of cement and reinforcing rods.

Embodiment 65

Heated molten palm stearin 50 w/t parts was impregnated into the dehydrated edible fiber mass of the thread shape 100 w/t parts. Then the edible material of thread shape was provided.

Embodiment 66

Heated molten palm stearin 130 w/t parts was impregnated into the dehydrated edible fiber mass of the thread shape 100 w/t parts. Then the edible material of thread shape was provided.

Embodiment 67

The soy bean gum paste 50 w/t parts was impregnated into the dehydrated edible fiber mass of the thread shape 100 w/t parts. Then the edible material of thread shape was provided.

Embodiment 68

The soy bean gum paste 130 w/t parts was impregnated into the dehydrated edible fiber mass of the thread shape 100 w/t parts. Then the edible material of thread shape was provided.

The dehydrated edible fiber mass of the thread shape of the embodiments 65~68 was measured how much tension could be tolerated. The embodiment 65 was 35 g. The embodiment 66 was 38 g. The embodiment 67 was 28 g. The embodiment 68 was 20 g.

As compared with the original intact dehydrated edible fiber mass of twisted thread shape without any impregnation, the impregnated fiber mass with palm stearin and soy bean gum paste was much more durable. Therefore, the edible material having reinforced concrete-like structure has the starch fiber as the reinforcing rod in the reinforced concrete. There, the reinforcing edible non-fiber material as the cement was shown in order of strength as following sequences: syrup, syrup+stearin, sugar, stearin, gum paste, no non-fiber material as the cement.

Embodiment 69

EVO oil 4 g, mango fat 4 g, powdered skim milk 1.85 g, salt 0.1 g, and vitamin C 0.05 g were mixed (quantity of total lipid 80%).

The above edible material could be used as the margarine. The combination ratio of each ingredient of this edible material was changed. But the above combination ratio was most suitable at points such as taste, eating sensation, etc. In addition, similar edible material was provided even if mango fat was exchanged with palm stearin.

Embodiment 70

EVO oil 4.5 g, cocoa butter 3.5 g, powdered skim milk 1.85 g, salt 0.1 g, and vitamin C 0.05 g were mixed (quantity of total oils and fats 80%).

The above edible material could be used as the margarine. The combination ratio of each ingredient of this edible material was changed. But the above combination ratio was most suitable at points such as taste, eating sensation, etc.

Embodiment 71

EVO oil 5 g, avocado fat 1 g, powdered skim milk 3.8 g, salt 0.1 g, and vitamin C 0.1 g (quantity of total oils and fats 60%).

The above edible material could be used as the spread. The combination ratio of each ingredient of this edible material was changed. But the above combination ratio was most suitable at points such as taste, eating sensation, etc.

In order to show the soft feeling at the low temperature, the lipid (oils and fats) of the low melting point is necessary in the food. In order to show the solid feeling at the high temperature, the lipid (oils and fats) of the high melting point is necessary in the food.

Embodiment 72

Palm oleine 5 g, palm stearin 30 g, and palm kernel oil 65 g were mixed. The provided edible material could be used as the margarine group (mainly, margarine and shortening) within 10-28 degrees Celsius. Then, this edible material 10 g was mixed with soybean powder (soybean flour) of a variety amount.

The above provided edible material showed extremely slight brown and slight soybean taste at the added quantity 0.5 g of the soy bean powder. At the added quantity 1-9 g, it showed slight brown and weak soybean taste. At the added quantity 10-39 g, it showed brown and clear soybean taste. At the added quantity 40-70 g, it became similar like peanut butter. At the added quantity 75 g, it became the form of hard lump.

The demand for health food increases rapidly all over the world. Many effective ingredients are found from a soybean. Until now, all existing margarine itself contains unhealthy material such as warned processed oil and fat, etc. Therefore, the mixture of such substances cannot be sold for health. But, the above edible material of the embodiment 72 contains healthy soybeans. And it does not contains dangerous processed oil and fat. Therefore it can be used as health food.

The above edible material of the embodiment 72 of 100 w/t parts was mixed with dry fruits 1~50 w/t parts. Then the more delicious food could be provided. Mixture ratio 20 w/t parts of the dry fruit made the most delicious food.

In addition, the above edible material of the embodiment 72 was mixed with a variety of natural sweeteners. After the examination, the fruit of the date palm was suitable.

Embodiment 73

EVO oil 3 g, powdered skim milk 3.8 g, salt 0.1 g, vitamin C 0.1 g (quantity of total lipid 42.9%).

The above edible material had a form of soft paste. And this could be used as the replacement of margarine group (spread). In addition, when water was added into this edible material, it stiffened more. And the water could be added up to 15 g for the edible material 100 g. When the added quantity of the water exceeded 15 g, the water could not be well mixed and it separated.

Embodiment 74

Palm stearin 4 g, powdered skim milk 3.7 g, refined sugar 5 g, and cocoa powder were mixed.

The above edible material was similar like chocolate. However this chocolate had a melting point of 60 degrees Celsius. Therefore, this chocolate did not melt in the mouth. And it had the eating sensation similar like pate.

Embodiment 75

Palm stearin 2.5 g, dry crushed copula 0.5 g, and chocolate 11.6 g were mixed.

The above edible material was similar like chocolate. This edible material had the melting point of 33 degrees Celsius. Therefore, it was stable even at the room temperature of the summer. And the temperature of the mouth is about 37 degrees Celsius. Therefore it melted in the mouth immediately. And the eating sensation was good. In addition, the structural fibers and the oils and fats of the copula made the smooth sensation on the tongue. The general chocolate has begun to melt at 26 degrees centigrade.

The chocolate cocoa butter has crystal structure from type I to type VI. The general chocolate is tempered at around 28-30 degrees Celsius for a long time. Then, the crystal structure becomes fine crystal type V. When the chocolate is molten and re-solidified, the crystals of type IV and VI, etc. rise to the surface and the blooming occurs. Then, the flavor deteriorates.

The general chocolate and the edible material of the embodiment 75 were molten at 60 degrees Celsius. Then they were stored at 30 degrees Celsius for 60 minutes. And then they were stored at 2 degrees Celsius for 90 minutes successively. At this time, the general chocolate caused blooming. The above edible material repeated the warming and cooling four times. But the blooming was not seen at all. In addition, this embodiment could be made only with natural oil and fat fractions. And this did not need BOB (glyceryl dibehenate monooleate) of a high melting point. The BOB is manufactured by hydrolysis and resynthesis of oil and fat.

As shown above, the chocolate-containing edible material of the embodiment 75 was hard to produce blooming, even after re-solidification after melting.

The melting point of the edible material of embodiment 75 could be regulated by changing the mixing ratio of the palm stearin and the chocolate. For example, palm stearin 0 g and chocolate 14.1 g made the melting point 26 degrees Celsius. And, palm stearin 14.1 g and chocolate 0 g made the melting point 60 degrees Celsius.

In addition, the edible material of the embodiment 74 and 75 had surfactant action. The surfactant action could be regulated by the quantity of the dry crushed copula and the powdered milk.

When oil and fat are mixed with finely powdered acid, it becomes more viscous similar like acid coagulation. Vitamin C concentration from 0.1% to 1%, 0.5% in particular, was suitable, with consideration of taste too. Less than 0.01% was suitable in the whip from a point of the taste in particular.

When vegetable oil is mixed with finely powdered salt, it becomes more viscous similar like salting out. Salt concentration from 0.1% to 3%, 1% in particular, was suitable, with consideration of taste too. Less than 0.02% was suitable in the whip from a point of the taste in particular.

Generally when substances are digested and resolved, their melting points and boiling points falls down mostly. However, the triglycerides constituting oils and fats are reverse in many cases. And many of them raise the melting points. For example, when tristearin of melting point 55 degrees Celsius is digested and resolved with lipase, it becomes two stearic acid molecules of melting point 69-70 degrees Celsius and one stearin monoglyceride molecule of melting point 56-58 degrees Celsius. There is lipase activity in rice, rice bran in particular. When the rice bran was added to palm kernel oil by 1% concentration, the melting point rose 2 degrees Celsius. The eating sensation did not change. The digestion resolution is hydrolysis. Therefore, the equilibrium point of the reaction can be decided with a very small amount of water content. But in addition, by adding protease, the reaction can be terminated by the decomposition of the lipase and protease itself. In addition, the reaction can be stopped by a lipase inhibiter.

Embodiment 76

Then, this inventor tried to harden the liquid oil and fat at normal temperature with lipase. Rice bran (having the lipase activity) was added to and mixed with palm kernel oil. And the concentration became 1%.

The above edible material of the embodiment 76 raised melting point 2 degrees Celsius, as compared with the pure palm kernel oil only. And this could be used as a margarine replacement. And the eating sensation did no change at all, as compared with the pure palm kernel oil only.

Embodiment 77

Lipase A for food (Amano Enzyme Company) was added to and mixed with palm kernel oil, in order to make 1% concentration.

Embodiment 78

Lipase AY for food (Amano Enzyme Company) was added to and mixed with palm kernel oil, in order to make 1% concentration.

Embodiment 79

Lipase G for food (Amano Enzyme Company) was added to and mixed with palm kernel oil, in order to make 1% concentration.

Embodiment 80

Lipase R for food (Amano Enzyme Company) was added to and mixed with palm kernel oil, in order to make 1% concentration.

Embodiment 81

Newlase F3G (lipase, Amano Enzyme Company) was added to and mixed with palm kernel oil, in order to make 1% concentration.

All of the above edible materials of the embodiment 76~81 hardened slightly. And they could be used as a margarine replacement. Among the lipases, lipase G for food which was used in the embodiment 79 was the most effective. Then the sodium bicarbonate of the quantity of 1/10 of the saponification value of oil and fat was added. This raised the melting point 2 degrees Celsius. And the taste was good. And this was stable for a long term. Cf.: palm kernel oil (saponification value=247), NaHCO3 (molecular weight; 84), KOH (molecular weight; 56.1). 247×84/56.1=370 mg/g. And 1/10 of this quantity was used.

As shown above, the lipase could harden the various kind of oil and fat which is liquid at normal temperature. This could be used as a margarine replacement.

The lipid protects epithelium. The crude oil and plant gum paste contain a lot of nutritious vitamins and phosphatides, which protect the epithelium and the nerves. As usually experienced in medical care, the nervous system has close relationship with epithelial disorders as follows: the dermal disorders, such as atopic dermatitis, etc., and the epithelial disorders of digestive organs, respiratory organs, and urogenital organs. The soybean gum paste 100% is too much viscous to handle. When the paste was mixed with the soybean gum paste to 10% concentration, it became easy to handle. Then the nutritious ingredients of the crude oil were contained. And also, the taste and the drinking and eating sensation were good. This was also easy to use for stomatitis. This was used for the atopic dermatitis and the dermatitis sicca of the following people: 6 years old woman, 8 years old man, 24 years old man, 26 years old man, 28 years old woman, 36 years old woman, and 76 years old man. This was effective not only for the dermatitis but also for the wound which was cured more rapidly. Then this obtained high evaluation.

What is claimed is:

1. An edible material, which comprises:
    (a) a mass of dehydrated edible starch fibers, in the form of cotton, each of said fibers having a diameter of less than 100 μm, and
    (b) an edible non-fiber material impregnating the dehydrated edible starch fibers, and wherein said edible material is superior in shape retention properties to the dehydrated edible starch fibers and the edible non-fiber material.

2. The edible material according to claim 1, wherein said dehydrated edible starch fibers have a porosity ratio from 95 to 99.95%.

3. The edible material according to claim 1, wherein each of said fibers of said dehydrated edible starch fibers have a diameter of from 5 to 20 μm.

4. The edible material according to claim 1, wherein said dehydrated edible starch fibers are shaped for retention of a lipid.

5. The edible material according to claim 1, wherein said dehydrated edible starch fibers are oil fat hardeners.

6. The edible material according to claim 1, wherein said dehydrated edible starch fibers are obtained by lyophilization of a water solution of starch having a concentration higher than 0.1% and lower than 1.6% of starch.

7. The edible material according to claim 6, wherein said water solution of starch has a concentration lower than 0.8% of starch.

8. The edible material according to claim 1, wherein said edible material contains 80% or more of a lipid.

9. The edible material according to claim 1, wherein said edible non-fiber material is liquid at normal temperature.

10. The edible material according to claim 1, wherein said edible non-fiber material is chocolate.

11. The edible material according to claim 8, wherein said lipid is a liquid oil fat at normal temperature.

12. The edible material according to claim 1, wherein said edible non-fiber material contains palm kernel oil and a hydrophilic lipophobic substance.

13. The edible material according to claim 1, wherein said edible material is chocolate or butter which is solid at 30~200 degrees Celsius.

14. The edible material according to claim 1, wherein said edible material is margarine.

15. The edible material according to claim 1, wherein said edible material is plastic.

16. The edible material according to claim 1, wherein said edible non-fiber material is corn syrup.

17. The edible material according to claim 1, wherein said edible material does not contain water.

18. The edible material according to claim 1, wherein said dehydrated edible starch fibers are produced by lyophilization of a water solution of starch and wherein said edible non-fiber material is extra virgin olive oil.

\* \* \* \* \*